US009768626B2

(12) United States Patent
Henman et al.

(10) Patent No.: US 9,768,626 B2
(45) Date of Patent: Sep. 19, 2017

(54) SIMULTANEOUS CHARGING OF A PLURALITY OF AUTONOMOUS SEISMIC NODES

(71) Applicant: Seabed Geosolutions B.V., Leidschendam (NL)

(72) Inventors: Richard Edward Henman, Horsham (GB); Arne Henning Rokkan, Olsvik (NO); Johan Fredrik Næs, Trondheim (NO); Mariann Ervik, Trondheim (NO); Leif Johan Larsen, Alversund (NO); Bjarne Isfeldt, Mathopen (NO)

(73) Assignee: SEABED GEOSOLUTIONS B.V., Leidschendam (NL)

( * ) Notice: Subject to any disclaimer, the term of this patent is extended or adjusted under 35 U.S.C. 154(b) by 42 days.

(21) Appl. No.: 14/828,850

(22) Filed: Aug. 18, 2015

(65) Prior Publication Data
US 2016/0056645 A1   Feb. 25, 2016

Related U.S. Application Data

(60) Provisional application No. 62/038,941, filed on Aug. 19, 2014.

(51) Int. Cl.
*H02J 7/00* (2006.01)
*G01V 1/38* (2006.01)
(Continued)

(52) U.S. Cl.
CPC .............. *H02J 7/0021* (2013.01); *G01V 1/18* (2013.01); *G01V 1/247* (2013.01); *G01V 1/3852* (2013.01); *H02J 7/007* (2013.01); *H02J 7/0045* (2013.01)

(58) Field of Classification Search
CPC ........ H02J 7/0021; H02J 7/007; H02J 7/0045; G01V 1/18; G01V 1/3852
(Continued)

(56) References Cited

U.S. PATENT DOCUMENTS 5,044,461 A * 9/1991 Aronstam .............. G01V 1/184
175/50
5,698,667 A   12/1997 Baer
(Continued)

FOREIGN PATENT DOCUMENTS

WO   2014/027892 A1   2/2014

OTHER PUBLICATIONS

"Smart Battery Data Specification Revision 1.1", SBS Implementers Forum, Dec. 11, 1998, downloaded from www.sbs-forum.org.
(Continued)

*Primary Examiner* — M'Baye Diao
(74) *Attorney, Agent, or Firm* — Park, Vaughan, Fleming & Dowler LLP; Shane A. Nelson

(57) ABSTRACT

Systems, methods, and apparatuses related to automatically and simultaneously charging a plurality of autonomous seismic nodes on a marine vessel before and/or after deployment to the seabed are disclosed. A plurality of autonomous seismic nodes are simultaneously charged in a CSC approved ISO container. Each autonomous seismic node may comprise a plurality of power connectors, a plurality of rechargeable batteries, and a battery management system. Each of the nodes may be configured to couple with a charging system on the marine vessel, which may include a power source, one or more power/charging stations, one or more power connectors, and a network. The node may have a plurality of power connectors disposed within a plurality of grooves that are configured to couple with a plurality of charging rails for simultaneous charging.

19 Claims, 11 Drawing Sheets

(51) Int. Cl.
*F16L 1/12* (2006.01)
*G01V 1/18* (2006.01)
*G01V 1/24* (2006.01)

(58) Field of Classification Search
USPC .................. 320/112, 107; 367/15; 405/166
See application file for complete search history.

(56) References Cited

U.S. PATENT DOCUMENTS

| | | | |
|---|---|---|---|
| 6,024,344 A | 2/2000 | Buckley | |
| 6,796,077 B1 * | 9/2004 | Dupree | A01K 85/01 43/17.6 |
| 7,310,287 B2 | 12/2007 | Ray | |
| 7,632,043 B2 | 12/2009 | Thompson | |
| 7,646,670 B2 * | 1/2010 | Maxwell | G01V 1/16 181/122 |
| 7,660,203 B2 | 2/2010 | Barakat | |
| 7,675,821 B2 | 3/2010 | Berg | |
| 7,883,292 B2 | 2/2011 | Thompson | |
| 8,111,143 B2 * | 2/2012 | Tong | G01D 21/00 340/1.1 |
| 8,172,480 B2 * | 5/2012 | Thompson | G01V 1/3852 405/166 |
| 8,427,900 B2 | 4/2013 | Fleure | |
| 8,579,545 B2 | 11/2013 | Jewell | |
| 8,632,274 B2 | 1/2014 | Thompson | |
| 8,675,446 B2 | 3/2014 | Gateman | |
| 9,459,366 B2 * | 10/2016 | Henman | G01V 1/3852 |
| 9,595,833 B2 * | 3/2017 | Isfeldt | G01V 1/38 |
| 2008/0137484 A1 * | 6/2008 | Scott | G01V 1/186 367/188 |
| 2008/0219094 A1 | 9/2008 | Barakat | |
| 2013/0028047 A1 | 1/2013 | Erofeev et al. | |
| 2014/0129163 A1 | 5/2014 | Betzner | |
| 2015/0219790 A1 * | 8/2015 | Gateman | G01V 1/16 367/13 |
| 2015/0316675 A1 * | 11/2015 | Brizard | G01V 1/16 405/209 |
| 2015/0331126 A1 * | 11/2015 | Lambert | G01V 1/3808 367/15 |
| 2016/0041285 A1 * | 2/2016 | Rokkan | G01V 1/3843 405/166 |
| 2016/0310996 A1 * | 10/2016 | Gateman | G01V 1/38 |

OTHER PUBLICATIONS

"Battery Management System" article retrieved from: http://en.wikipedia.org/w/index.php?title=Battery_management_system&oldid=618429154, page last modified on Jul. 24, 2014 at 15:37.

* cited by examiner

SIMULTANEOUS CHARGING OF A PLURALITY OF AUTONOMOUS SEISMIC NODES

PRIORITY

This application claims priority to U.S. provisional patent application No. 62/038,941, filed on Aug. 19, 2014, the entire contents of which is incorporated herein by reference.

BACKGROUND OF THE INVENTION

Field of the Invention

This invention relates to marine seismic systems and more particularly relates to the use of rechargeable autonomous seismic nodes deployed on the seabed and the simultaneous charging systems and methods thereof.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded during a seismic survey. One such OBN system is offered by the Applicant under the name Trilobit®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel.

Autonomous ocean bottom nodes are independent seismometers, and in a typical application they are self-contained units comprising a housing, frame, skeleton, or shell that includes various internal components such as geophone and hydrophone sensors, a data recording unit, a reference clock for time synchronization, and a power source. The power sources are typically battery-powered, and in some instances the batteries are rechargeable. In operation, the nodes remain on the seafloor for an extended period of time. Once the data recorders are retrieved, the data is downloaded and batteries may be replaced or recharged in preparation of the next deployment. Various designs of ocean bottom autonomous nodes are well known in the art. Prior autonomous nodes include spherical shaped nodes, cylindrical shaped nodes, and disk shaped nodes. Other prior art systems include a deployment rope/cable with integral node casings or housings for receiving autonomous seismic nodes or data recorders. Some of these devices and related methods are described in more detail in the following patents, incorporated herein by reference: U.S. Pat. Nos. 6,024,344; 7,310,287; 7,675,821; 7,646,670; 7,883,292; 8,427,900; and 8,675,446.

Typically, the power source is a battery that is a non-rechargeable battery such as lithium or alkaline. In some instances, these power sources may be rechargeable batteries. Typically, the batteries for autonomous nodes are manually replaced or recharged after the nodes are retrieved on the marine vessel. If the batteries are to be replaced, an operator generally opens or dissembles the individual node unit and removes the battery and replaces it with a new battery, along with other quality control, servicing, and data retrieval operations. If the batteries are to be recharged, the operator can open the node unit and remove the rechargeable battery and replace it with a recharged battery, or manually connect a cable separately to each node to recharge the battery (with or without removing the battery from the node). For these direct recharging connections, the cable is typically attached to an external connection on the node for battery recharging, which can also transfer data at the same time.

One known node storage system is disclosed in U.S. Pat. No. 8,050,140 ("Ray et al."), and is incorporated herein by reference. Ray et al. discloses a method and apparatus for storing, deploying, and retrieving a plurality of seismic devices. Among other things, Ray discloses a method for retrieving data from and recharging the battery on a node while the node is stored on a storage rack. Each node sits on a storage rack adjacent an individual connector for that node. Each individual connector must be physically connected to each node and permits recorded seismic data to be extracted, the clock to be synchronized, and the power source to be recharged.

Whether manually replacing batteries or recharging batteries, either process has numerous problems, including slow recharge or replacement rate, the need for each node to have an external physical connection (which are prone to corrosion and sealing issues), and the need to physically connect each node to a physical connection for data transfer, each of which leads to overall efficiency, reliability, and operating errors. Further, the use of manpower to replace or charge the batteries is very extensive and time consuming and requires space between nodes to access and recharge the nodes. Further, conventional storage containers/modules are inefficient with lots of wasted space between the nodes (to allow operator access). A marine vessel with thousands of nodes stored and utilized would require a large number of storage containers/modules based on conventional charging techniques.

A need exists for an improved autonomous seismic node design for automated node storage, handling, deployment, and recovery. A need exists for an improved method and system for seismic node charging, and in particular one that allows for the rapid charging of a plurality of nodes in a highly automated fashion that can be utilized on a variety of marine vessels and nodes with limited operator involvement. A need exists for a seismic node design that enables large numbers of nodes to be operated in the field.

SUMMARY OF THE INVENTION

Systems, methods, and apparatuses related to automatically and simultaneously charging a plurality of autonomous seismic nodes on a marine vessel before and/or after deployment to the seabed are disclosed.

In one embodiment, the autonomous seismic node comprises a plurality of rechargeable battery cells, a plurality of charging connectors coupled to the plurality of rechargeable battery cells, and a battery management system configured to regulate the charging of the plurality of rechargeable battery cells. Each of the nodes may be configured to couple with a charging system on the marine vessel, which may include a power source, one or more power/charging stations, one or more power connectors, and a network. In one embodiment, a storage rack in a container has a plurality of charging rails that the plurality of nodes can be placed upon for storage and charging. The node may have a plurality of power connectors disposed within a plurality of grooves that are configured to couple with the plurality of charging rails for simultaneous charging. The plurality of autonomous seismic nodes may be simultaneously charged in a CSC approved ISO container.

In one embodiment, a method of automatically charging a plurality of autonomous seismic nodes comprises positioning a plurality of autonomous seismic nodes proximate to a plurality of charging connectors located on a storage rack, wherein each of the plurality of autonomous seismic nodes has a plurality of rechargeable battery cells and simultaneously charging the plurality of autonomous seismic nodes.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Node Deployment

Figure 1A:
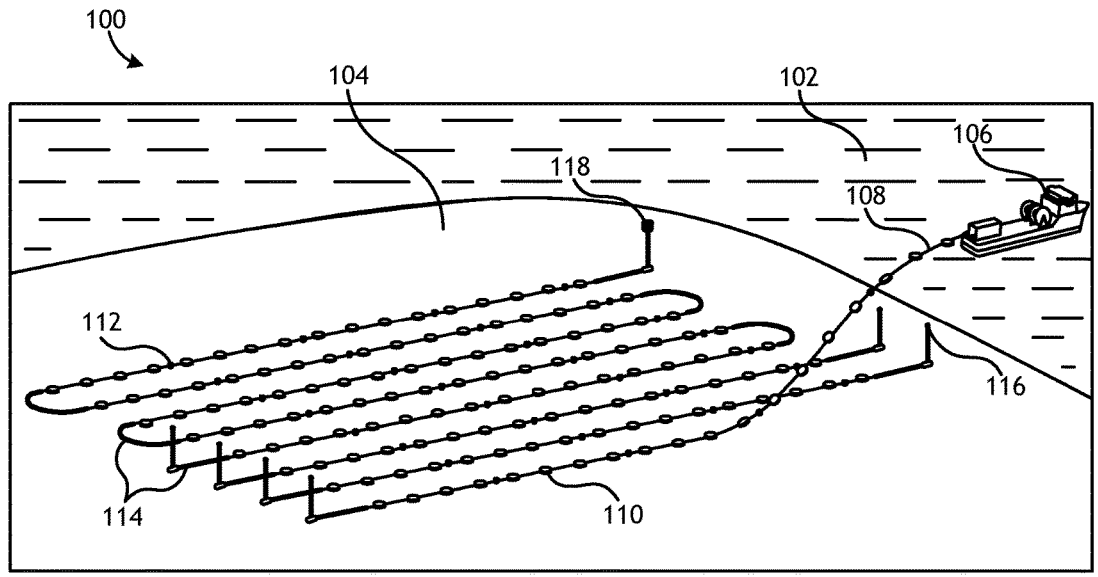
FIG. 1A is a schematic diagram illustrating one embodiment of a system for marine deployment of an autonomous seismic node.
Figure 1B:
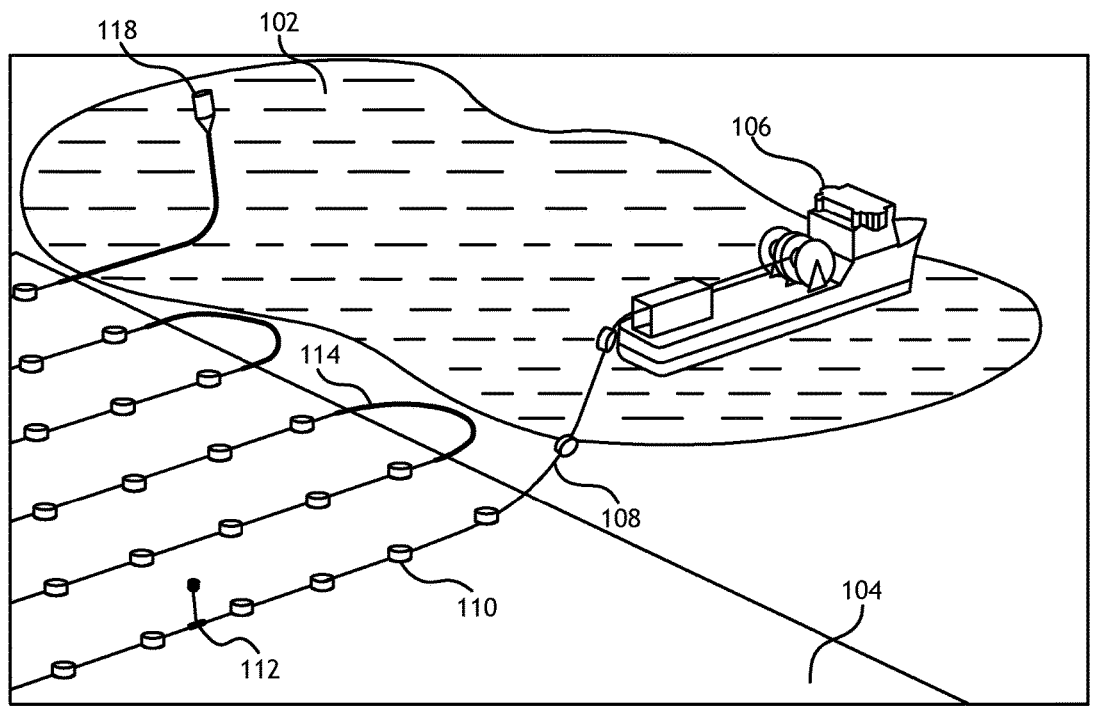
FIG. 1B is a schematic diagram illustrating one embodiment of a system for marine deployment of an autonomous seismic node.

FIGS. 1A and 1B illustrate a layout of a seabed seismic recorder system that may be used with autonomous seismic nodes for marine deployment. FIG. 1A is a diagram illustrating one embodiment of a marine deployment system 100 for marine deployment of seismic nodes 110. One or more marine vessels deploy and recover a cable (or rope) with attached sensor nodes according to a particular survey pattern. In an embodiment, the system includes a marine vessel 106 designed to float on a surface 102 of a body of water, which may be a river, lake, ocean, or any other body of water. The marine vessel 106 may deploy the seismic nodes 110 in the body of water or on the floor 104 of the body of water, such as a seabed. In an embodiment, the marine vessel 106 may include one or more deployment lines 108. One or more seismic nodes 110 may be attached directly to the deployment line 108. Additionally, the marine deployment system 100 may include one or more acoustic positioning transponders 112, one or more weights 114, one or more pop up buoys 116, and one or more surface buoys 118. As is standard in the art, weights 114 can be used at various positions of the cable to facilitate the lowering and positioning of the cable, and surface buoys 118 or pop up buoys 116 may be used on the cable to locate, retrieve, and/or raise various portions of the cable. Acoustic positioning transponders 112 may also be used selectively on various portions of the cable to determine the positions of the cable/sensors during deployment and post deployment. The acoustic positioning transponders 112 may transmit on request an acoustic signal to the marine vessel for indicating the positioning of seismic nodes 110 on sea floor 104. In an embodiment, weights 114 may be coupled to deployment line 108 and be arranged to keep the seismic nodes 110 in a specific position relative to sea floor 104 at various points, such as during start, stop, and snaking of deployment line 108.

FIG. 1B is a close-up view illustrating one embodiment of a system 100 for marine deployment of seismic nodes 110. In an embodiment, the deployment line 108 may be a metal cable (steel, galvanized steel, or stainless steel). Alternatively, the deployment line 108 may include chain linkage, rope (polymer), wire, or any other suitable material for tethering to the marine vessel 106 and deploying one or more seismic nodes 110. In an embodiment, the deployment line 108 and the seismic nodes 110 may be stored on the marine vessel 106. For example, the deployment line may be stored on a spool or reel or winch. The seismic nodes 110 may be stored in one or more storage containers. One of ordinary skill may recognize alternative methods for storing and deploying the deployment line 108 and the seismic nodes 110.

In one embodiment, the deployment line 108 and seismic nodes 110 are stored on marine vessel 106 and deployed from a back deck of the vessel 106, although other deployment locations from the vessel can be used. As is well known in the art, a deployment line 108, such as a rope or cable, with a weight attached to its free end is dropped from the back deck of the vessel. The seismic nodes 110 are preferably directly attached in-line to the deployment line 108 at a regular, variable, or selectable interval (such as 25 meters) while the deployment line 108 is lowered through the water column and draped linearly or at varied spacing onto the seabed. During recovery each seismic node 110 may be clipped off the deployment line 108 as it reaches deck level of the vessel 106. Preferably, nodes 110 are attached directly onto the deployment line 108 in an automated process using node attachment or coupling machines on board the deck of the marine vessel 106 at one or more workstations or containers. Likewise, a node detaching or decoupling machine is configured to detach or otherwise disengage the seismic nodes 110 from the deployment line 108, and in some instances may use a detachment tool for such detaching. Alternatively, seismic nodes 110 can be attached via manual or semi-automatic methods. The seismic nodes 110 can be attached to the deployment line 108 in a variety of configurations, which allows for free rotation with self-righting capability of the seismic node 110 about the deployment line 108 and allows for minimal axial movement on deployment line 108 (relative to the acoustic wave length). For example, the deployment line 108 can be attached to the top, side, or center of seismic node 110 via a variety of configurations.

Once the deployment line 108 and the seismic nodes 110 are deployed on the sea floor 104, a seismic survey can be performed. One or more marine vessels 106 may contain a seismic energy source (not shown) and transmit acoustic signals to the sea floor 104 for data acquisition by the seismic nodes 110. Embodiments of the system 100 may be deployed in both coastal and offshore waters in various depths of water. For example, the system may be deployed in a few meters of water or in up to several thousand meters of water. In some configurations surface buoy 118 or pop up buoy 116 may be retrieved by marine vessel 106 when the seismic nodes 110 are to be retrieved from the sea floor 104. Thus, the system 110 may not require retrieval by means of a submersible or diver. Rather, pop up buoy 116 or surface buoy 118 may be picked up on the surface 102 and deployment line 108 may be retrieved along with seismic nodes 110.

As mentioned above, to perform a seismic survey that utilizes autonomous seismic nodes, those nodes must be deployed and retrieved from a vessel, typically a surface vessel. In one embodiment a node storage and service system is coupled to one or more deployment systems. The node storage and service system is configured to handle, store, and service the nodes before and after the deployment and retrieval operations performed by a node deployment system. Such a node storage and service system is described in more detail in U.S. patent application Ser. No. 14/711,262, filed on May 13, 2015, incorporated herein by reference. Such a node deployment system is described in more detail in U.S. patent application Ser. No. 14/820,285, filed on Aug. 6, 2015, entitled Overboard System for Deployment and Retrieval of Autonomous Seismic Nodes, incorporated herein by reference.

Autonomous Seismic Node Design

Figure 2A:
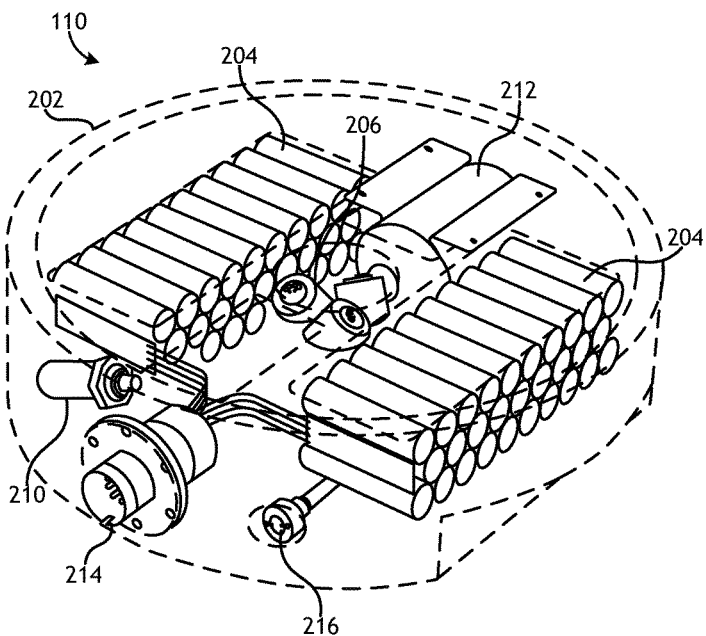
FIG. 2A illustrates a perspective view diagram of one embodiment of an autonomous seismic node.

FIG. 2A illustrates a perspective view diagram of autonomous ocean bottom seismic node 110. Seismic node 110 may include body 202, such as a housing, frame, skeleton, or shell, which may be easily dissembled into various components. Additionally, seismic node 110 may include one or more power sources 204. Additionally, the seismic node may include pressure release valve 216 configured to release unwanted pressure from seismic node 110 at a pre-set level. The valve protects against fault conditions like water intrusion and outgassing from a battery package. Additionally, the seismic node may include electrical connector 214 configured to allow external access to information stored by internal electrical components, data communication, and/or power transfer. During the deployment the connector is covered by a pressure proof watertight cap 218 (shown in FIG. 2B). In other embodiments, the node does not have an external connector and data is transferred to and from the node wirelessly, such as via wireless electromagnetic or optical links. In other embodiments, there may be multiple connectors on the node, one for data transfer and one connector for power transfer. In the prior art, an external connector (such as that shown as element 214 in FIG. 2) is typically the standard way to charge a node by a separate plug or wire that must be manually inserted into the node.

In an embodiment, the internal electrical components may include one or more hydrophones 210, one or more (preferably three) geophones 206 or accelerometers, and a data recorder 212. In an embodiment, the data recorder 212 may be a digital autonomous recorder configured to store digital data generated by the sensors or data receivers, such as hydrophone 210 and the one or more geophones or accelerometers 206. One of ordinary skill will recognize that more or fewer components may be included in the seismic node 110. For example, there are a variety of sensors that can be incorporated into the node including and not exclusively, inclinometers, rotation sensors, translation sensors, heading sensors, and magnetometers. Except for the hydrophone, these components are preferably contained within the node housing that is resistant to temperatures and pressures at the bottom of the ocean, as is well known in the art. In an embodiment, the seismic node includes one or more components configured for wireless transmission of data to and from the node via electromagnetic or optical components. Data can be retrieved from the node during deployment or, more preferably, from the node while the node is in a workstation or container on board the marine vessel.

In an embodiment, power source 204 may be lithium-ion battery cells or rechargeable battery packs for an extended endurance (such as 90 days) on the seabed, but one of ordinary skill will recognize that a variety of alternative battery cell types or configurations may also be used. In one embodiment, the power source for each node is one or more sets of rechargeable batteries that can operate in a sealed environment, such as lithium, nickel, lead, and zinc based rechargeable batteries. Numerous rechargeable battery chemistries and types with varying energy densities may be used, such as lithium ion, lithium ion polymer, lithium ion iron phosphate, nickel metal hydride, nickel cadmium, gel lead acid, and zinc based batteries. Various rechargeable battery chemistries offer different operating parameters for safety, voltage, energy density, weight, and size. For example, voltage for a lithium ion battery may offer 3.6V with an energy density of 240 Wh/kg and 550 Wh/L. In various embodiments, the battery cell(s) may include a lithium-ion battery cell or a plurality of lithium-ion windings. In another embodiment, the battery cell may include a lithium-ion electrode stack. The shape and size of the battery cell(s) may be configured according to the power, weight, and size requirements of the seismic sensor node. One of ordinary skill will recognize a variety of battery cell types and configurations that may be suitable for use with the present embodiments. In some embodiments, the rechargeable battery pack includes a plurality of battery cells.

Figure 2B:
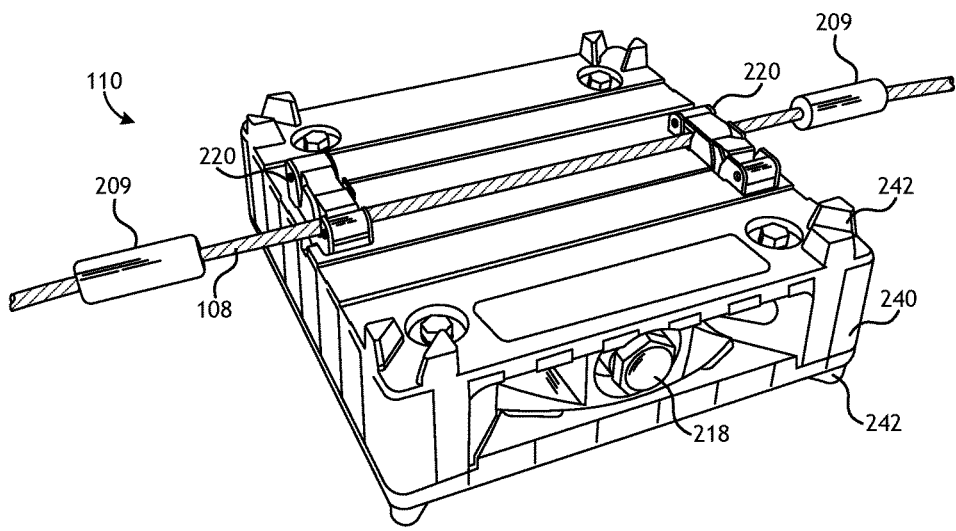
FIG. 2B illustrates a perspective view diagram of another embodiment of an autonomous seismic node.

While the node in FIG. 2A is circular in shape, the node can be any variety of geometric configurations, including square, rectangular, hexagonal, octagonal, cylindrical, and spherical, among other designs, and may or may not be symmetrical about its central axis. In one embodiment, the node consists of a watertight, sealed case or pressure housing that contains all of the node's internal components. In another embodiment, the pressurizing node housing is partially and/or substantially surrounded by a non-pressurized node housing that provides the exterior shape, dimensions, and boundaries of the node. In one embodiment, the node is square or substantially square shaped so as to be substantially a quadrilateral, as shown in FIG. 2B. One of skill in the art will recognize that such a node is not a two-dimensional object, but includes a height, and in one embodiment may be considered a box, cube, elongated cube, or cuboid. While the node may be geometrically symmetrical about its central axis, symmetry is not a requirement. Further, the individual components of the node may not be symmetrical, but the combination of the various components (such as the pressurized housing and the non-pressurized housing) provide an overall mass and buoyancy symmetry to the node. In one embodiment, the node is approximately 350 mm×350 mm wide/deep with a height of approximately 150 mm. In one embodiment, the body 202 of the node has a height of approximately 100 mm and other coupling features, such as node locks 220 or protrusions 242, may provide an additional 20-50 mm or more height to the node.

In another embodiment, as shown in FIG. 2B, the node's pressure housing may be coupled to and/or substantially surrounded by an external non-pressurized node housing 240. Various portions of non-pressurized node housing 240 may be open and expose the pressurized node housing as needed, such as for hydrophone 210, node locks 220, and data/power transfer connection 214 (shown with a fitted pressure cap 218 in FIG. 2B). In one embodiment, the upper and lower portions of the housing include a plurality of gripping teeth or protrusions 242 for engaging the seabed and for general storage and handling needs. Non-pressurized node housing 240 provides many functions, such as protecting the node from shocks and rough treatment, coupling the node to the seabed for better readings (such as low distortion and/or high fidelity readings) and stability on the seabed, and assisting in the stackability, storing, alignment, and handling of the nodes. Each node housing may be made of a durable material such as rubber, plastic, carbon fiber, or metal, and in one embodiment may be made of polyurethane or polyethylene. In still other embodiments, the seismic node 110 may include a protective shell or bumper configured to protect the body.

In one embodiment, the seismic node 110 comprises one or more direct attachment mechanisms and/or node locks 220 that may be configured to directly attach the seismic node 110 to a deployment line 108. This may be referred to as direct or in-line node coupling. In one embodiment, the attachment mechanism 220 comprises a locking mechanism to help secure or retain the deployment line 108 to the seismic node 110. A plurality of direct attachment mechanisms may be located on any surfaces of the node 110 or node housing 240. In one embodiment, a plurality of node locks 220 is positioned substantially in the center and/or middle of a surface of a node or node housing. The node locks may attach directly to the pressure housing and extend through the node housing 240. In this embodiment, a deployment line, when coupled to the plurality of node locks, is substantially coupled to the seismic node on its center axis. In some embodiments, the node locks may be offset or partially offset from the center axis of the node, which may aid the self-righting, balance, and/or handling of the node during deployment and retrieval. The node locks 220 are configured to attach, couple, and/or engage a portion of the deployment line to the node. Thus, a plurality of node locks 220 operates to couple a plurality of portions of the deployment line to the node. The node locks are configured to keep the deployment line fastened to the node during a seismic survey, such as during deployment from a vessel until the node reaches the seabed, during recording of seismic data while on the seabed, and during retrieval of the node from the seabed to a recovery vessel. The disclosed attachment mechanism 220 may be moved from an open and/or unlocked position to a closed and/or locked position via autonomous, semi-autonomous, or manual methods. In one embodiment, the components of node lock 220 are made of titanium, stainless steel, aluminum, marine bronze, and/or other substantially inert and non-corrosive materials, including polymer parts.

Node Handling System

The configuration and design of the node deployment, handling, service, and storage system (generically referred to as a node handling system) must complement and take into account the design of the node itself. As related to the present disclosure, the node handling system must take into account the configuration and parameters of the charging system of the node. Various configurations of the node handling system are consistent with the present invention.

Figure 3:
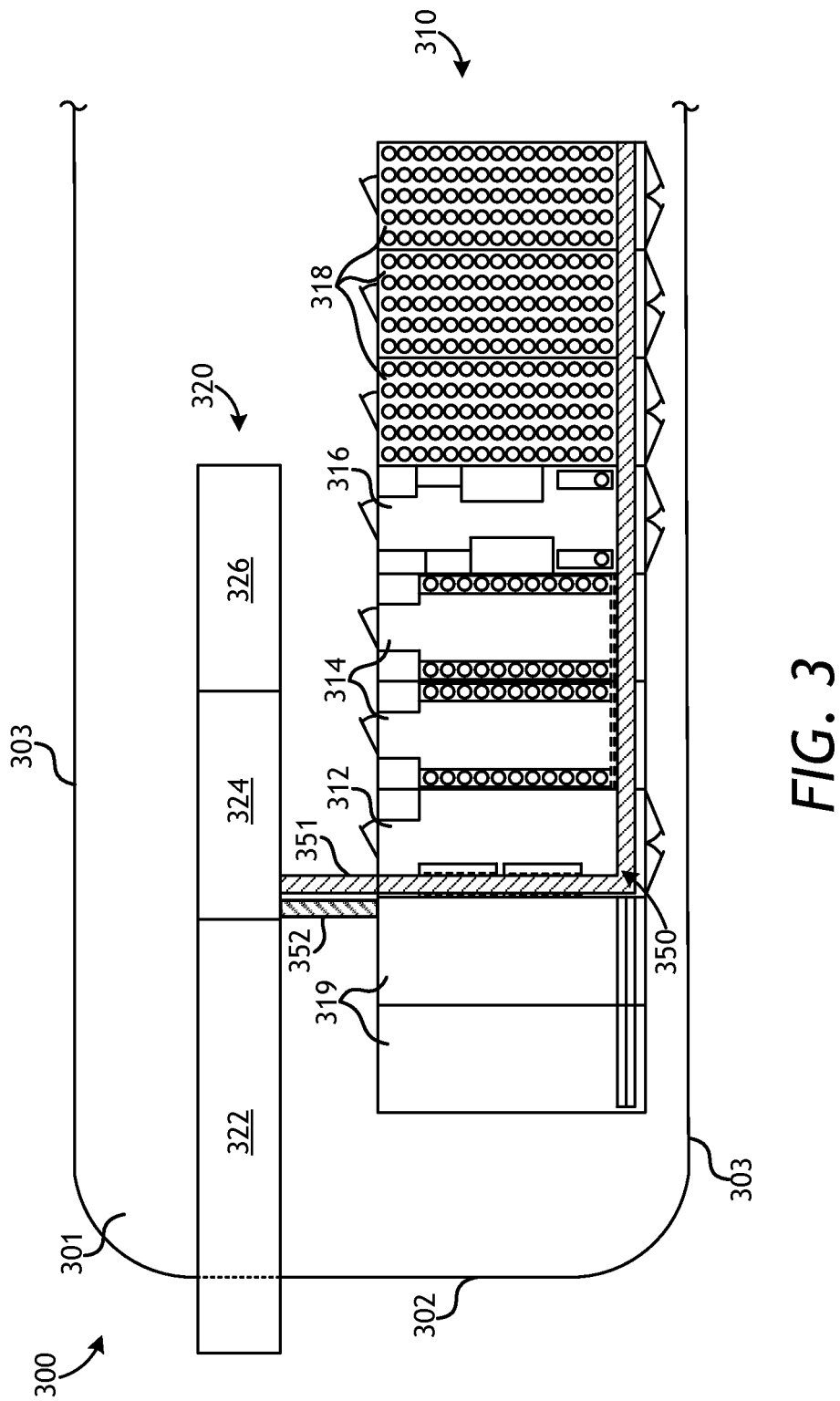
FIG. 3 is a schematic diagram illustrating one embodiment of a node deployment system and a node storage and service system on the back deck of a marine vessel.

As mentioned above, to perform a seismic survey that utilizes autonomous seismic nodes, those nodes must be deployed and retrieved from a vessel, typically a surface vessel. FIG. 3 illustrates a schematic of one embodiment of a deck handling system 300 of a surface vessel. While the deck handling system may be located on any portion of the vessel, in one embodiment it is located on the back deck of a marine vessel. Of relevance to FIG. 3, the vessel 301 comprises a back, end, or aft section 302 and two sides 303. For convenience purposes, the rest of the marine vessel is not shown in FIG. 3. As shown in FIG. 3, in one embodiment node storage and service system 310 is coupled to one or more deployment systems 320.

Node storage and service system 310 is configured to handle and store the nodes before and after the deployment and retrieval operations performed by node deployment system 320. Node storage and service system 310 is configured such that each operational task is located within a container. In one embodiment, each container has separate control systems for local and/or remote operation of the tasks performed in the container. With this container-based system, the addition and/or removal of service and storage containers based on the particular survey and/or vessel requirements is straightforward. In one embodiment, node storage and service system 310 consists of a plurality of containers, including cleaning container 312, charging/downloading containers 314, service/maintenance container 316, charging/storage containers 318, and auxiliary containers 319, which are interconnected by conveyor or transport system 350. In one embodiment, transport system 350 comprises a conveyor section 351 that couples deployment system 320 to node storage and service system 310 and conveyor section 352 that is configured to transfer auxiliary equipment (such as weights and transponders) between the deployment system and the node storage and service system. Charging/storage container 318 (and the charging/storage racks contained therein) is discussed in more detail in relation to FIGS. 12A-12C below. In some embodiments, downloading containers 314 may be eliminated, as any necessary data transfer may be performed in charging/storage containers 318 or during transport within or between one of the other containers.

Node deployment system 320 may include a plurality of containers, with separate containers containing one or more winches in container 326, one or more node installation devices in container 324, and one or more overboard units in container 322, and other devices and/or systems to facilitate deployment and/or retrieval of a plurality of autonomous seismic nodes from the water before and after the nodes are used in a seismic survey. In a first or deployment mode, node deployment system 320 is configured to deploy a length of cable into a body of water, receive nodes from node storage and service system 310, to couple those nodes to a deployment line, and to deploy those nodes into a body of water. In a second or retrieval mode, node deployment system 320 is configured to retrieve a length of cable from a body of water, retrieve nodes from the body of water, de-couple those nodes from a deployment line, and to transfer those nodes to node storage and service system 310. Thus, node deployment system 320 may also be characterized as a node retrieval system in some situations. In one embodiment, the deployment line is stopped in the correct position and the seismic node is manually attached to the deployment line, and in another embodiment the seismic node is accelerated to match the deployment speed of the deployment line and automatically attached to the deployment line. In one embodiment, each node is coupled to and/or integrated with a node lock, as described in more detail in U.S. patent application Ser. No. 14/736,926, filed on Jun. 11, 2015, incorporated herein by reference. The node locks (and attached nodes) may be coupled to and decoupled from the deployment line via node deployment system 320.

In one embodiment, the node handling system may operate in automatic, semi-automatic, or manual processes. A partially or entirely automated system reduces man-power requirements for deployment and retrieval operations and increases overall safety, efficiency, and reliability of the seismic survey. Additionally, such embodiments may allow for operation in harsh climates and situations where conventional seismic surveys were dangerous and/or not practically possible.

In some embodiments, the components of the node handling system may be installed in standard sized CSC approved ISO containers in a plurality of configurations on the back deck of a marine vessel. In other embodiments, non-standardized containers or modules may be utilized. In one embodiment, the contents of each container may be modified for the particular task of the container, such as node storage, node servicing, node cleaning, line deployment/retrieval, line tensioning, node attaching/detaching, etc. The containers can be transported via air, road, train, or sea to a destination harbor and mobilized on a suitable vessel. The containers may be transferred to the deck of a vessel via a crane or other lifting device and then secured to the deck and coupled to each other through conventional fastening/securing procedures and mechanisms. The containers may be positioned side to side, end to end, and even on top of each other (up to 3 or 4 levels high) on the deck depending on the specific layout of the containers, need of the survey, and requirements of the vessel. The system setup may vary from job to job and from vessel to vessel, in both layout and number of containers utilized. Standard sized containers are typically 20 or 40 feet long and 8 feet wide, and may be 8 feet, 6 inches tall for standard height containers to 9 feet, 6 inches tall or higher for high-cube containers. Each container preferably has a floor, roof, and sidewalls, with various portions removed to facilitate transfer of nodes to, from, and within each container as needed, or to allow service personnel access to the container. These containers may include additional frame supports to the floor and/or sides, but in one embodiment would be CSC approved ISO containers.

Charging System

Figure 4:
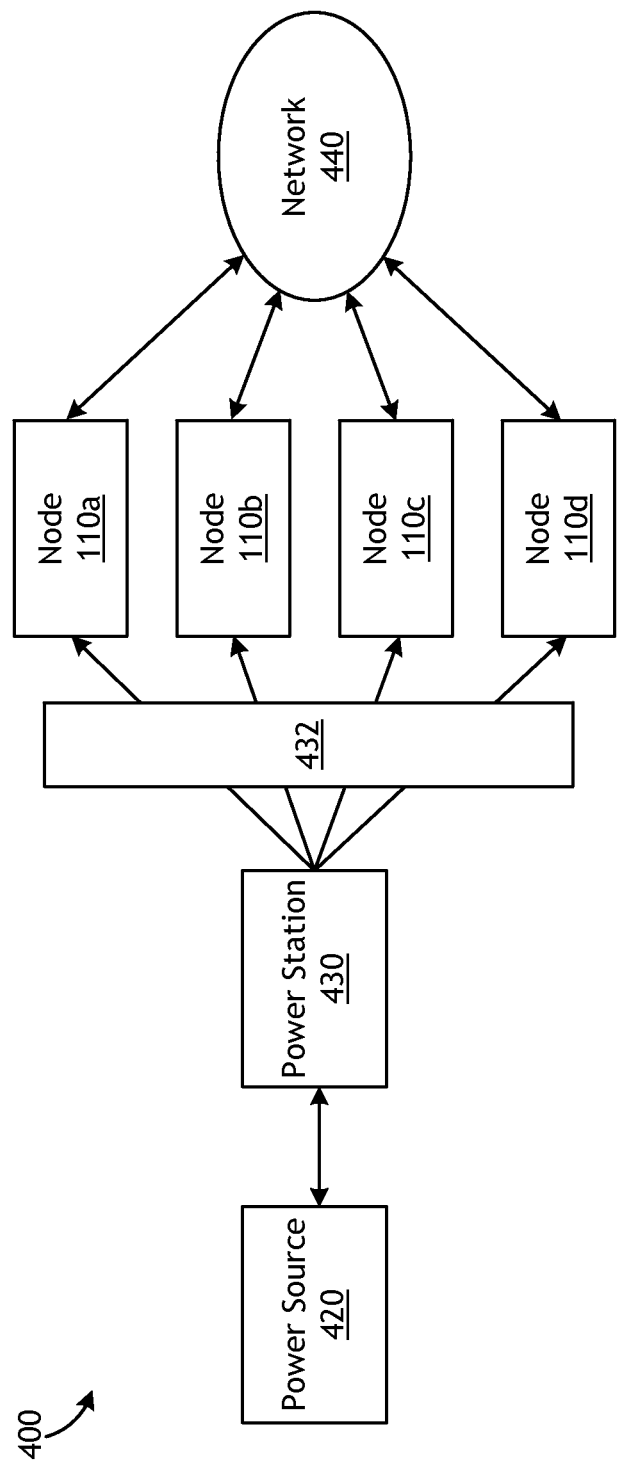
FIG. 4 is a schematic block diagram illustrating one embodiment of a system for charging an autonomous seismic node.

FIG. 4 illustrates one embodiment of a system 400 for simultaneously charging a plurality of seismic nodes 110. In an embodiment, charging system 400 may be a shipboard system for use with deployable seismic nodes from a marine vessel. The system may include a plurality of autonomous seismic nodes 110a, 110b, etc., each with its own battery charging system (see FIG. 5). The system may include one or more charging or power stations 430 configured to supply power to and/or otherwise charge each seismic node. Each power station 430 may be coupled to power source 420, such as the ship's electrical power system, a generator, a battery bank, a solar power system, a wind turbine power system, etc. In one embodiment, power station 430 may receive power from the power source. Power station 430 may receive Alternating Current (AC) power in some embodiments; alternatively, depending upon the configuration of a power system on board the marine vessel, power station 430 may receive Direct Current (DC) power from power source 420. Power station 430 may convert the power received from power source 420 into power suitable for supplying to the rechargeable batteries on the node by any number of known power conversion methods. In one embodiment, power station 430 may charge the batteries on the node via a physical contact connection, such as rails, rods, racks or other power connectors and/or power coupling devices 432. In one embodiment, power connector 432 may comprise a plurality of power connectors to supply a power and negative connection to each node. Power connector 432 may be part of and/or coupled to power station 430. In one embodiment, power connector 432 is directly coupled to a plurality of autonomous seismic nodes 110. In other embodiments, power station 430 may charge the seismic nodes via a wireless radio frequency connection or inductive connection. In still other embodiments, the batteries on the nodes are inductive batteries, and charging system 400 is configured to inductively charge a plurality of seismic nodes 110 simultaneously. While a preferred location of charging system 400 is on a marine vessel, other locations are also preferred, such as on an ROV, cage, or subsea platform or container. Power station 430 may directly couple to a plurality of autonomous nodes that are to be charged at the same time, while in other embodiments may be coupled to multiple pluralities of autonomous nodes, in which different sets of nodes may be charged at different times, based on power supply requirements and other control system parameters, as well as the time of arrival of the nodes to the power station. Further, charging system 400 may include more than one charging station based upon necessary power supply requirements, the configuration of the nodes during storage or charging, and the configuration of the charging container itself. The intelligent control of the node through communication network 440 can be used to independently regulate the charge rate into each respective node 110a, 110b, etc. based on the location of the node station, position in the charging/storage container, and/or when the node is due for its next deployment.

In an embodiment, charging system 400 also comprises network 440, which may be a data communication network, such as an Internet Protocol (IP) local area network, or be powered by the Ethernet by a Power over Ethernet (POE) router. In one embodiment, network 440 is configured to couple each of the components of charging system 400 together as well as provide the node system with precision GPS referenced timing. In some embodiments, network 440 couples charging system 400 with one or more battery management and/or charging control systems, whether located on nodes 110 or power station 430. In one embodiment, charging system 400 is connected to other components or systems on the vessel, such as a data handling system and the master control system on the vessel for overall node deployment, storage, and handling. A data handling system on the vessel may also be coupled to network 440 and may be configured to communicate data with seismic nodes 110 and/or the charging system 400 while the nodes are being charged. In some embodiments, charging system 400 may also determine if an individual node is not properly connected and provide warning signals to alert technicians.

As shown in FIG. 4, charging system 400 and/or power station 430 may simultaneously connect to a plurality of seismic nodes 110. In one embodiment, power station 430 powers each of the plurality of nodes 110a, 110b, etc. for a predetermined amount of time to recharge the batteries on the node. In other embodiments, the charging is regulated by a charging management system on power station 430 that communicates directly to the batteries of each node using smart battery data specifications and protocols to monitor the battery status from the individual intelligent battery management systems built installed in each battery pack. In still other embodiments, the charging is regulated by a battery management system on each node or coupled to a plurality of nodes, as discussed in more detail in relation to FIG. 5. In some embodiments, power station 430 is configured to communicate with each of the plurality of nodes 110 that are being charged within power station 430. Power station 430 may be configured to interact with each of the plurality of nodes via data communications over the charging rails or even wirelessly. In one embodiment, data may be exchanged over the charging rails by conventional communications, such as utilizing network over powerline techniques, in which data signals may be sent over electrical wiring/power conductors (e.g., the charging rails) at a much higher frequency than the supplied power/electricity (which typically uses only 50/60 Hz signals). Power station 430 may be configured to selectively charge one or more of the plurality of seismic nodes at varying times and at varying currents. In other embodiments, power station 430 is configured to charge one or more of the plurality of seismic nodes with varying current and/or charge duration. In still other embodiments, the charging of a seismic node can be regulated by control circuitry or management systems at either node 110 or power station 430 that are configured to send data and/or signals between the charging station and one or more of the nodes.

Charging system 400 may be located in one or more containers on the vessel (such as a CSC approved ISO container), which may be a dedicated charging container or a general storage container (such as storage container 318 in FIG. 3) that is also configured to simultaneously charge a plurality of nodes. Such storage/charging containers are discussed in more detail in relation to FIGS. 12A-12C. By recharging the nodes while in storage, a separate station or container for recharging or replacing the batteries—and the related time required for the separate recharge or replacement—may be avoided. In one embodiment, data is retrieved from the nodes in a manual, semi-manual, or automatic process in a downloading or servicing container or conveyor in route to the charging/storage container. In other embodiments, a fully automated power charging and data transfer container may be utilized, in which data can be transferred wirelessly to each of the plurality of nodes while the batteries are being automatically recharged. In these embodiments, seismic node 110 may not have an external data/power connector 214 (as shown in FIGS. 2A, 2B), or in some embodiments connector 214 would function as a backup data/power connector. In other embodiments, both data and power flows between the charging station and the nodes via the coupling device 432.

Figure 5:
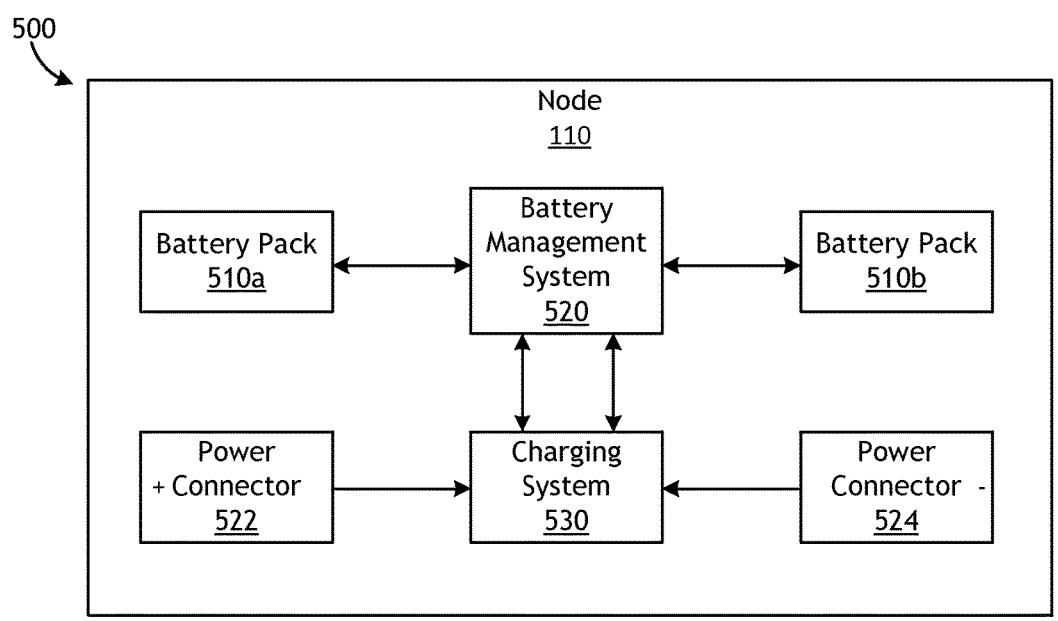
FIG. 5 is a schematic block diagram illustrating one embodiment of a charging system of an autonomous seismic node.

FIG. 5 illustrates one embodiment of battery charging system 500 of seismic node 110. As shown, battery charging system 500 includes one or more battery cells or packs 510a, 510b, a battery management system 520, charging system 530, and one or more power or charging connectors 522, 524. One of ordinary skill in the art will recognize that any autonomous seismic node may have additional components, including but not limited to one or more of hydrophone(s), geophone(s), sensors, recording units, and data connectors (via wired or wireless means), as discussed in relation to FIGS. 2A and 2B. Battery cells 510a, 510b may be substantially similar to battery 204 (see FIGS. 2A and 2B) and may be any rechargeable battery cell or plurality of battery cells.

In one embodiment, power connectors 522, 524 are electrically isolated from each other as well as the casing, housing, and/or exterior shell of the node. In one embodiment, battery charging system 500 of the node comprises two battery packs (each with a plurality of batteries and/or battery cells) 510a, 510b and a positive terminal power connector 522 and a negative terminal power connector 524, all interconnected to battery management system 520. In one embodiment, each of the positive and negative terminal power connectors connects to each of the battery packs. In another embodiment, each of the positive and negative terminal power connectors initially interfaces or couples with the battery management system, which then is separately connected to the batteries. Seismic node 110 may include one or more recesses, grooves, or openings, each configured to receive one or more power connector electrodes. The power connector electrodes may be configured to couple, receive, and/or retain power coupling device 432 (or portions thereof) in a position suitable for transmission of power from the charging station to the node. The power coupling device can be removed and/or inserted into the node receptacles by a variety of methods, such as by manual, semi-manual, or automatic means. The power coupling device and/or charging system can interface with a plurality of nodes for simultaneous battery charging without removing the batteries from the nodes and/or separately connecting a physical wire to each node.

In one embodiment, battery charging system 500 comprises charging system 530 that is configured to monitor batteries 510a, 510b and communicate with an external control system either by network over powerline techniques or by wireless ethernet. Charging system 530 may comprise a standalone computer system (such as the autonomous recording system) with built in firmware and hardware that can communicate with battery management system 520 using defined protocols and communication hardware such as I2C, RS232, or other standard wired connections. The microprocessor system can interrogate the battery management system in each battery pack or battery system to determine a large number of parameters and sensors using a smart battery data protocol, such as Smart Battery Specification (SBS) 1.1 or higher, as described in Smart Battery Data Specifications, Revision 1.1, Dec. 11, 1998, incorporated herein by reference. In some embodiments, the functionality of charging system 530 may be incorporated into battery management system 520.

In one embodiment, battery management system 520 is an electronic system that manages rechargeable batteries 510a, 510b, such as by protecting the batteries from operating outside their safe operating parameters and controlling their charging by communicating status information to the intelligent charging system 530. One of the purposes of a battery management system ("BMS") is to regulate the charging of the rechargeable batteries in an efficient and safe manner. In an embodiment, BMS 520 constantly (or periodically) monitors the voltage and/or charge of batteries 510a, 510b on the node before, during, and/or after charging and before, during, and/or after deployment into a body of water. In an embodiment, BMS 520 is configured to decrease or stop the flow of current to one or more of the batteries, battery cells, or groups of batteries in the seismic node during charging. In some situations, BMS 520 may be configured to interface with other components on the node. In one embodiment, BMS 520 is configured to interact with one or more data transfer components on the node to send and receive signals or communications regarding the status of the batteries to a device or system external to the node, such as power station 430 or a control system. In some embodiments, BMS 520 may communicate certain data to an external device (such as the node's central processing unit or the charging station) via wireless or serial communications. In other embodiments, BMS 520 comprises various shut down and fail-safe modes that prevent further charging to batteries 510 and provides warning signals to power station 430 and/or a control system of the node. In some embodiments, BMS 520 may also determine if an individual node is not properly connected to power station 430 and/or power connectors/coupling devices 432.

A number of conventional battery management systems can be utilized for the management and control of the charging of rechargeable battery packs 510a, 510b. In one embodiment, as described in U.S. Pat. No. 5,698,967, a programmed central processing unit (which may be located within BMS 520 and/or located within node 110 and coupled to BMS 520) provides management and control of a plurality of battery modules that is separately connected to a bulk charger, wherein each battery module includes a rechargeable battery (either battery cell or battery pack), a sensor node comprising a plurality of battery sensors, a microcontroller that processes signals generated by the sensors, and a direct current charger. This configuration allows BMS 520 to controllably provide a separate and independent charging current to each rechargeable battery 510a, 510b. In some embodiments during charging, a bulk charger (such as power station 430) provides a variable bulk charging current to a plurality of rechargeable batteries connected in series and each of the rechargeable batteries receive a charging current from individual direct current chargers (not shown in FIG. 5) positioned at each rechargeable battery. During the charging cycle, the voltage and temperature of rechargeable batteries 510a, 510b are monitored by the programmed central processing unit by means of the sensors and BMS 520 communications and the bulk charging current may be reduced proportionally to maintain a constant voltage on the battery pack when any battery voltage reaches a predetermined clamping voltage. Once the bulk charging current reaches a certain discharge rate or capacity, the bulk charger is turned off and the battery is considered to be 100% fully charged. During the final charging period of the bulk charging, BMS 520 switches on different resistors to bypass some current around individual cells that are reading higher voltages to ensure that the batteries are charged equally to the same voltage and have the same charge stored in each individual cell when the bulk charger is finally turned off.

In another embodiment, BMS 520 may monitor one or more conditions of battery cells 510a, 510b in seismic node 110 during charging, including voltage (e.g., total voltage, voltages of individual cells, minimum and maximum cell voltage), temperature, charge level, condition of battery, pressure, and current. BMS 520 is preferably configured to account for the type of rechargeable battery used (such as lithium ion or nickel metal hydride batteries), which affects various operating parameters of the batteries, node, and BMS. One of ordinary skill in the art will recognize that many additional conditions can be monitored or sensed and values can be calculated using BMS 520. In some embodiments, BMS 520 may include a central processing unit, charging units, sensors, and a recordable data device. In one embodiment, the current charger is a single direct current charger that provides a variable charging current to one or more of the batteries in the seismic node. In other embodiments, BMS 520 uses charging algorithms to provide a full battery charge to all of the batteries within the node by the use of a single direct current charger. In one embodiment, BMS 520 actively maintains a substantially uniform voltage or state of charge in substantially all of the battery cells that form the rechargeable battery packs 510a, 510b through load balancing. In order to maximize the battery's capacity, and to prevent localized under-charging or over-charging, BMS 520 may actively ensure that all the cells that compose batteries 510a, 510b are kept at the same voltage/charge through various balancing protocols. BMS 520 system may include a single centralized control unit connected to each battery cell, a distributed network of control units at each cell, or a hybrid model such that each of a plurality of control units are connected to a plurality of battery cells, or any combination thereof. The disclosed invention does not depend upon the type of battery management system utilized within the node.

Thus, by cooperation with a power station (such as power station 430) and a battery management system on each of a plurality of nodes (such as BMS 520), the plurality of autonomous seismic nodes can be charged simultaneously by any number of techniques. In one embodiment, power station 430 can provide a constant current and/or voltage to each of the plurality of autonomous nodes via power connectors 432 for a given period of time (such as between 15 minutes to 1 hour or more), and BMS 520 on each of the plurality of nodes is configured to regulate this constant power as necessary for the battery cells/batteries 510a, 510b within the individual node. Once the battery cells for a given node are full, the BMS within the node effectively stops the charging of the batteries within that node even though power connector 432 still has voltage on it and is capable of supplying power. Power station 430 can be turned on and off via a manual switch (which could be operated remotely) or based on one or more timing circuits configured to automatically stop charging after a predetermined period. In other embodiments, BMS 520 on each node is configured to interface (via wireless methods and/or non-wireless, such as power connectors 432) with a control system on power station 430 to regulate the voltage/current flow through power connectors 432. Thus, as the battery cells on the plurality of nodes 110a, 110b, etc. become charged, the power to power connectors 432 is decreased by the appropriate amount based on predetermined variables and control logic. As the batteries on the plurality of nodes become substantially and/or fully charged, the power to power connectors 432 is configured to shut off such that no power is being transferred to the plurality of nodes 110a, 110b, etc. In still other embodiments, after a first plurality of nodes are fully charged (such as nodes 110a, 110b), power station 430 is configured to charge a second set of autonomous seismic nodes (such as nodes 110c, 110d), which may require powering a second plurality of power connectors that are coupled to the second plurality of autonomous nodes.

Figure 6:
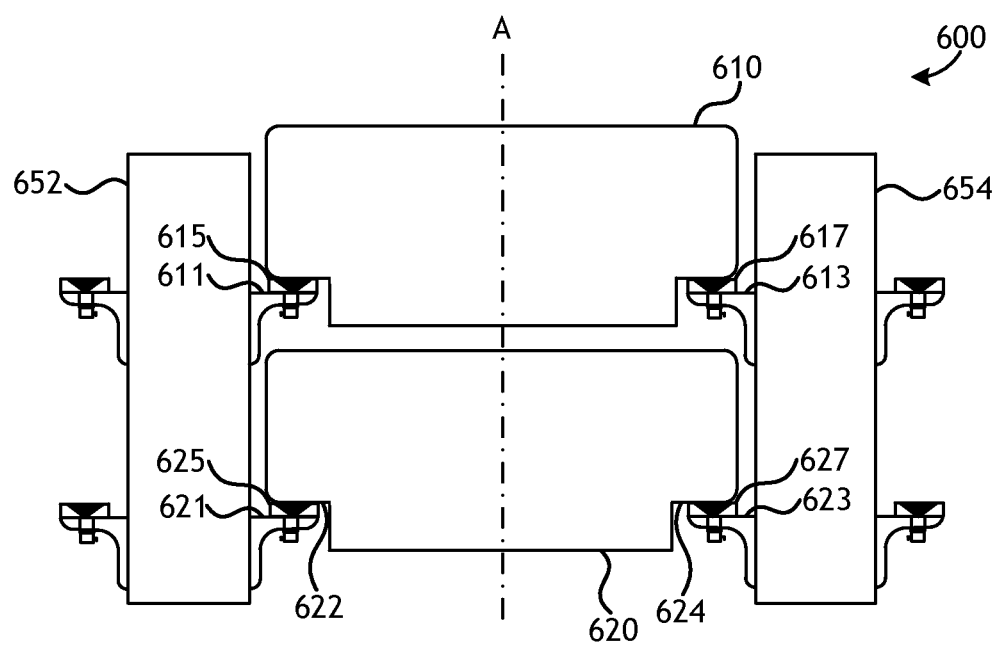
FIG. 6 illustrates one embodiment of an autonomous seismic node and a node charging system.

FIG. 6 illustrates one embodiment of a power and/or charging station 600 coupled to a plurality of autonomous seismic nodes 110. FIG. 6 shows one snapshot of a charging station in a storage/charging container; additional rows and racks are typically included in a container, which may hold 1000 or more nodes per container. In these embodiments, charging station 600 includes a plurality of power coupling devices (such as power connectors 432) that is coupled to the plurality of nodes. As will be appreciated (and discussed in more detail in reference to FIGS. 12A-12C), the storage system is designed for the size of the node, the total number of stored nodes, and the configuration of the power coupling device and corresponding node power receptacles.

In one embodiment, charging station 600 comprises a plurality of vertical racks 652, 654 on which a plurality of rows of autonomous seismic nodes may be placed. In one embodiment, nodes may be positioned in the spaces formed between racks 652 and 654 in rows, with centerline A marking the center line of the node and the center of racks 652, 654. Each rack 652, 654 may comprise a plurality of arms 611, 613 at approximately each node position, which are coupled to one or more node supporting/charging members 615, 617 for storage and/or holding of the nodes during charging. Thus, supporting/charging members may also act as power connectors and/or power coupling devices. In one embodiment, for each level of rack 652, 654 a first supporting/charging member 615 is attached to a plurality of arms 611 on one side of rack 652 and a second supporting/charging member 617 is attached to a plurality of arms 613 on one side of rack 654 (other sides of the racks would have corresponding arms and supporting/charging members to support and charge additional pluralities of nodes). In other embodiments, charging members 615, 617 are directly attached to racks 652, 654 without the use of arms 611, 613. Supporting/charging members 615, 617 (e.g., the power coupling devices) may be a guide, bar, pole, rail, wire, or cable (whether longitudinal or in a carousel/circular configuration) mechanism that is configured to couple and/or mate with each of the nodes for power transfer. In other embodiments, the power coupling device may comprise a bar with a plurality of connectors, pins, or probes on the bar that are each configured to mate with a node. This single connection/power transfer device eliminates the need for a large number of data connectors (such as conventional wire connectors) that must be manually inserted into a data receptacle on each node.

FIG. 6 illustrates two charging/storage rows or levels, each with a plurality of rails/bars acting as power connectors. The first charging level comprises power connector rails 615, 617 on which first node 610 is placed, and the second charging level comprises power connector rails 625, 627 on which second node 620 is placed. Additional nodes may be placed on the rails in a lateral/horizontal direction in front of and behind nodes 610, 620 for each row, as well as in adjacent rows in the same racks and in rows on adjacent racks. Each node 610, 620 has a plurality of grooves or receptacles that are configured to receive and/or sit upon the respective bars/rails. For example, node 620 comprises a node with two recesses on the lower face of the node on each side, marked as grooves 622, 624, each with one or more electrode and/or contact points that are configured to mate with power connector rails 625, 627, respectively. Other arrangements of the grooves on the node may be possible, and as shown in FIG. 7, may be located on the top, bottom, and/or one or more side faces of the node.

In one embodiment, each row on the storage/charging rack comprises two metal power connectors, such as power connectors 615, 617. In this embodiment, power coupling device 615 may act as the positive (+) power transfer device or component and power coupling device 617 may act as the negative/ground (−) power transfer device or component. This creates a closed loop/circuit for proper charging of the nodes. Thus, as shown in FIG. 6, a positive coupling device and a negative coupling device individually couple with separate positive and negative charging points on the node. In other embodiments, a single coupling device may have both positive and negative terminals (separated and/or isolated to each other) such that a single coupling device may engage with a single receptacle or recess (with isolated positive and negative terminals) on the node, as shown in more detail in FIGS. 9A-9C. In one embodiment, power coupling device 615 has a substantially uniform voltage such that all portions of the coupling device transfers substantially equivalent current to the plurality of nodes coupled to that coupling device. The power connectors (such as power coupling devices 615, 617) are part of and/or coupled to a power station to receive power. For example power coupling device 615 may be connected to a power station via a first wire, and power coupling device 617 may be connected to the power station via a second wire, and the power station is configured to regulate the power (whether voltage and/or current) output to the coupling devices as appropriate. In other embodiments, the coupling device has various interrupters/insulators that isolate various portions of the coupling device and allow different currents and/or voltages to different sections of the coupling device and to different nodes. In this embodiment, each separate section of the coupling device can be individually controlled and managed by a charging station or a battery management system.

Power Connectors on the Node

Figure 10A:
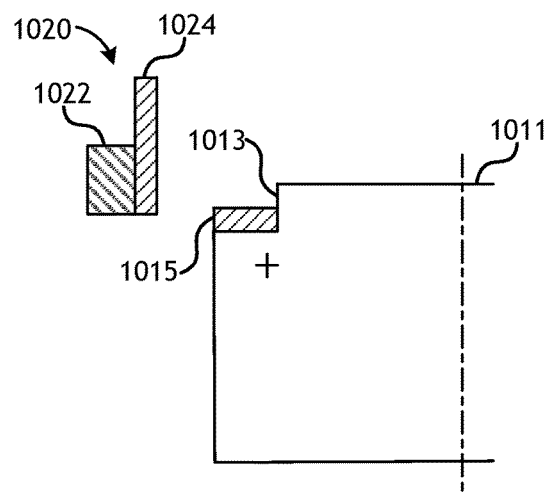
FIGS. 10A-10B illustrate one embodiment of an autonomous seismic node and a charging connector.
Figure 10B:
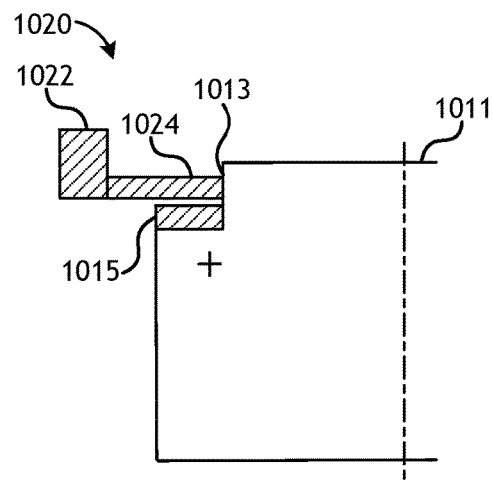

The design of the autonomous seismic node and the power station are integrated. The node must be configured to couple with the power connectors on the charging/power station. A wide variety of configurations are possible. In one embodiment, the power connectors are fixed and/or stationary such that the nodes must be transferred to the power connectors for charging (such as the embodiment shown in FIG. 6). In other embodiments, the power connectors have one or more movable parts or components that can automatically engage one or more of the plurality of nodes. In still other embodiments, the coupling device rotates or otherwise hinges open to contact and engage the plurality of nodes (such as shown in FIGS. 10A-10B). Likewise, the mating receptacles and/or grooves on the nodes may have a wide variety of configurations, including one or more faces of the node. In still other embodiments, seabed coupling protrusions on the node may be metallic and configured to operate as conductors/receptacles for charging the node.

FIGS. 7A-F illustrate various embodiments of a side view of a seismic node, and in particular the various embodiments of power connectors on a node. Each node has one or more contact points, connectors, or receptacles (generally referred to as power connectors) to receive power from a power station and/or power source. As illustrated, one or more power connectors can be located in one or more recesses, grooves, chambers, pockets, or openings on a seismic node. The power connectors can be located on the side, top, or bottom faces of the node. The power connectors may be located on the outside of a pressurized node housing or non-pressurized node housing such that they are exposed to the environment, such that the power connector (or specific mating portions thereof) be made of a non-corrosive material. The power connectors may be located in the non-pressurized housing (e.g., non-pressurized housing 240) and connected via wire to the internal components of the pressurized node housing. In some embodiments, the power connectors may be part of a power connector assembly. In one embodiment, a power connector assembly includes a power connector and a sealing device (such as a gasket or grommet or threaded sealable interface) that is pressure rated for 1000-5000 meters of seawater and is designed for long-term exposure to seawater. In one embodiment, the power connector assembly comprises a removable protector, barrier, or housing that protects the power connector while in a seabed application and exposed to harsh conditions. In an embodiment, the removable protector is removed by automatic means, and in other embodiments, the power connector protector is removed by engagement with the power coupling device on the power station.

Figure 7A:
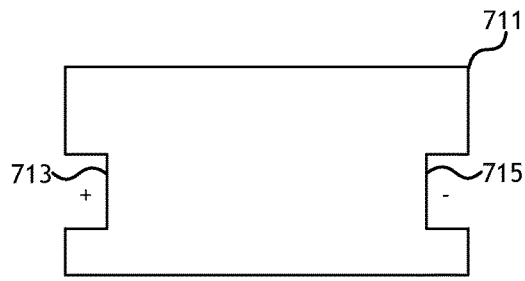
FIGS. 7A-7F illustrate various embodiments of an autonomous seismic node configured to be charged by a charging system.
Figure 7D:
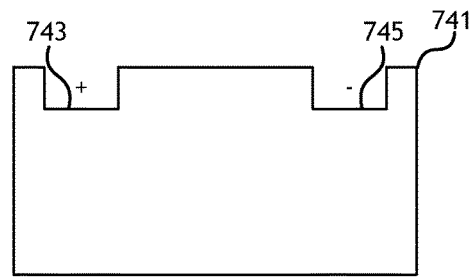
Figure 7B:
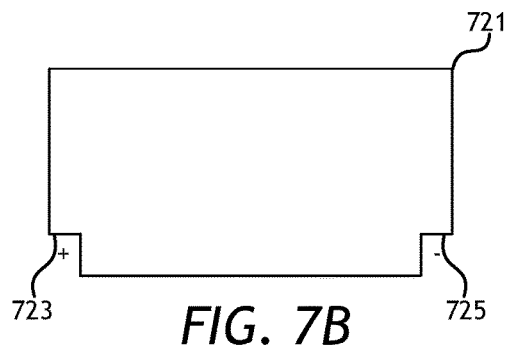
Figure 7E:
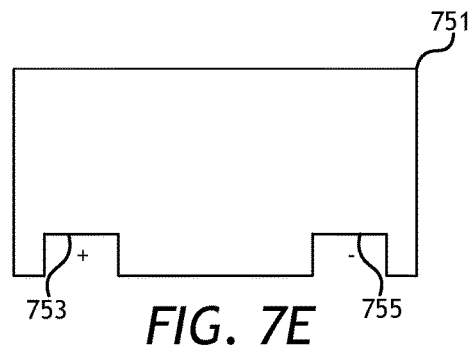
Figure 7C:
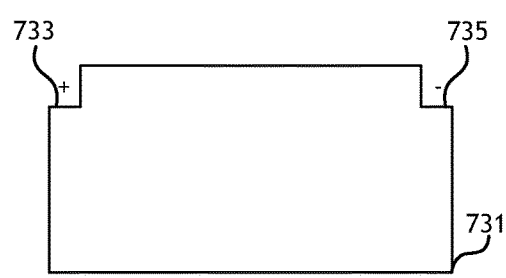

FIGS. 7A-7E illustrate an embodiment where the node comprises at least two separate power connectors or terminals, e.g., a positive connector and a negative connector on each node. FIG. 7A shows node 711 with a positive connector 713 and a negative connector 715 located on a first side groove and a second side groove of node 701, respectively. FIG. 7B shows node 721 with a positive connector 723 and a negative connector 725 located on the lower surface corners/edges of node 721, such that the connectors are partially located on a first and second side of the node, respectively, as well on the bottom surface of the node. Similarly, FIG. 7C shows node 731 with a positive connector 733 and a negative connector 735 located on the upper corners of node 731. FIG. 7D shows node 741 with a positive connector 743 and a negative connector 745 located on an upper surface or face of node 741. In other embodiments, the connectors can both be located on the bottom surface. For example, FIG. 7E shows node 751 with a positive connector 753 and a negative connector 755 located on the lower surface of node 751.

Figure 7F:
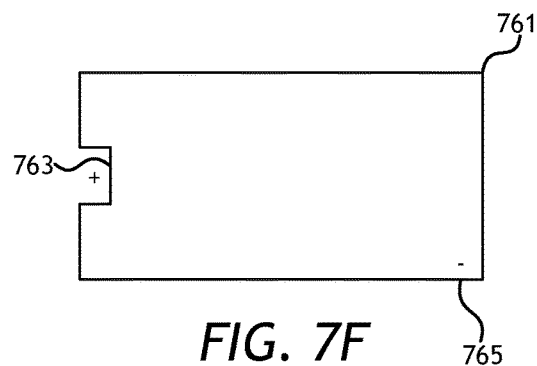

In still other embodiments, one connector can be located on a top surface (such as the positive connector) and the second connector can be located on the bottom surface (such as the negative connector), and may include the body of the node. For example, FIG. 7F illustrates an embodiment where node 761 comprises a positive power connector 763 within a side groove of node 761 (or at some other location) and the body (or a portion thereof) functions as negative connector 765. In this embodiment, while the node has two power connectors, the charging system on the node may be configured to have a portion of the body or all of the body function as the negative power connector to complete the charging circuit/loop on the node. Thus, in one embodiment, the body of the node, or a portion of the body of the node, may consist of bare metal and can act as one of the electrodes in the power connection to the node, preferably the ground/negative connection. In this configuration, the bare metal portion of the node housing/body is wired and/or electrically connected to other internal circuits of the node for proper electrical flow, such as one or more battery cells or the battery management system. For this embodiment, a power connector/coupling device of the power station may need only to engage positive power connector electrode 763 on the node (such as an extruded pin), while the storage rack (or in other embodiments another power coupling device) interfaces with metal portion 765 of the node to complete a power circuit for charging the node. Of course, in this instance positive power connector electrode 763 would need to be isolated and/or insulated from bare metal portion 765 of the node acting as the negative electrode.

Figure 8A:
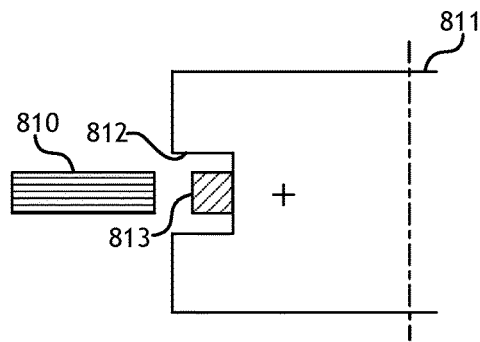
FIGS. 8A-8E illustrate various embodiments of an autonomous seismic node and a charging connector.
Figure 8B:
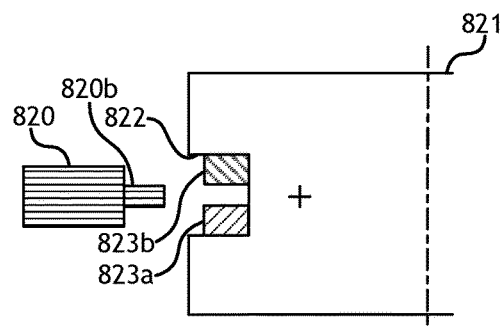
Figure 8C:
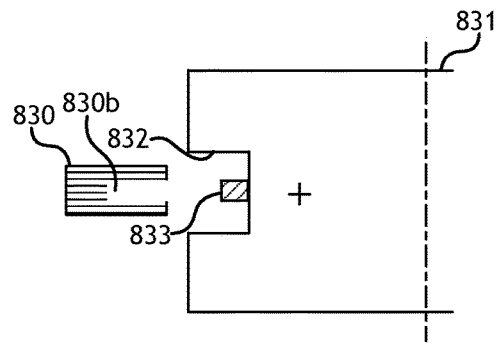
Figure 8D:
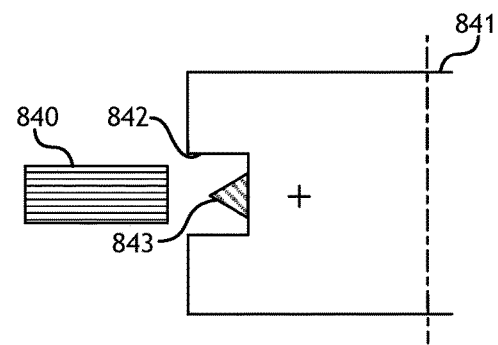
Figure 8E:
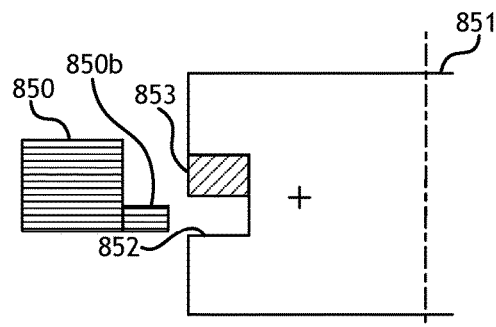

As shown in FIGS. 8A-8E, a variety of designs and configurations are possible for the mating interface between the power coupling device of the power station (e.g., power connectors 432, see FIG. 4) and the node power connectors on the seismic node (e.g., node power connectors 522, 524, see FIG. 5). In one embodiment, such a mating interface requires direct attachment, whereas other embodiments (such as inductive charging or other wireless/non-contact charging) do not require direct contact between the power coupling device and the node power connectors. In one embodiment, each node power connector may comprise more than one pin electrode and may include a series of pin electrodes (each with different sizes or shapes) for particular configurations. FIGS. 8A-8E shows a few such embodiments with a separate positive node power connector and a separate negative node power connector (only the positive connector side is shown for illustrative purposes). FIG. 8A illustrates an interface of two flush surfaces, such that node 811 comprises one or more flat pins 813 located in groove 812 that interfaces and/or mates with a unitary rail connector 810 of the power station. FIG. 8B illustrates rail 820 of the power station that comprises a T-shaped end 820b that interfaces with a plurality of pins (or a circular pin) 823a, 823b in an opening 822 on node 821. FIG. 8C illustrates rail 830 of the power station with a U-shaped end 830b that fits over a corresponding pin 833 in groove 832 on node 831. FIG. 8D illustrates an interface of two different surfaces, such that node 841 comprises a triangular or circular shaped electrode 843 in groove 842, such that only a portion of electrode 843 contacts power coupling device (e.g., a rail) 840. FIG. 8E illustrates rail 850 of the power station with a L-shaped end 850*b* that interfaces with one side of a corresponding pin 853 located within groove 852 on node 851. While only the positive power connector electrode is shown in these embodiments, a corresponding negative power connector electrode may be found on another portion of the node (such as the other side face or top or bottom faces).

Figure 9A:
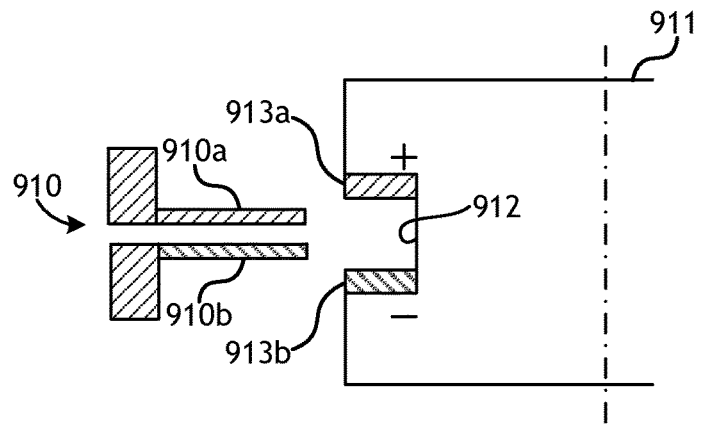
FIGS. 9A-9C illustrate various embodiments of an autonomous seismic node and a charging connector.
Figure 9B:
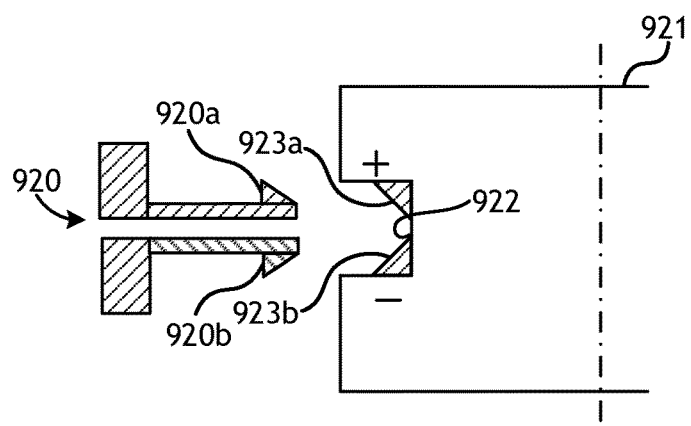
Figure 9C:
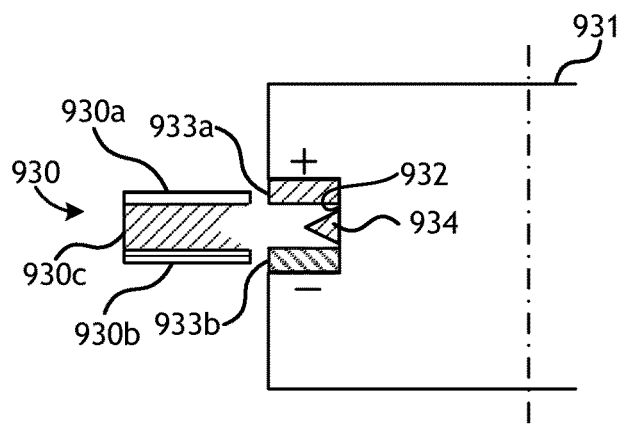

In some embodiments, both a positive and negative terminal and/or connector reside in opposing sides of a single opening, receptacle, and/or groove on the node. FIGS. 9A-9C illustrate embodiments of a node with such a combined positive and negative electrode in a single receptacle or opening. For these embodiments, a power coupling device on the power station may include both a positive and negative portion (which are isolated from each other) that interfaces with the respective positive and negative electrodes in the node receptacle. In some embodiments, the negative portion of the electrode is a part of the body of the node and is configured as a ground. In some embodiments, the power coupling device may include one or more arms, each corresponding to the positive and negative portions of the coupling device, that may be configured to extend apart from each other before or after mating with the node to obtain a better electrical coupling. For example, FIG. 9A illustrates node 911 having groove 912 with upper positive electrode 913*a* and lower negative electrode 913*b* that mates with power coupling device 910. Power coupling device 910 has first arm 910*a* that is configured as a positive power connector and second arm 910*b* that is configured as a negative power connector. Arms 910*a*, 910*b* are configured to expand and/or move apart to couple with node power connectors 913*a*, 913*b*. As another example, FIG. 9B illustrates node 921 having groove 922 with angled upper and lower electrodes 923*a*, 923*b* that are configured to interface with a plurality of angled arms 920*a*, 920*b* on power coupling device 920. As another example, FIG. 9C illustrates node 931 with flat electrode surfaces 933*a*, 933*b* on the upper and lower portions of groove 932 and separated by conical insulator 934, which is configured to mate with a corresponding geometric shape on power coupling device 930. Power coupling device 930 has positive upper connector 930*a* and lower negative connector 930*b* separated by insulator 930*c*, which may be configured to couple with insulator 934 to facilitate alignment and isolation of the positive and negative electrodes.

While the embodiments in FIGS. 8A-8E and FIGS. 9A-9C show grooves or openings on the side faces of the node, similar or equivalent mating receptacles may be found on the upper or lower (and/or corner) portions of the node for different charging configurations depending on the particular design of the node, the coupling device, and the charging/storage structure.

In other embodiments, the power coupling device of the power station may be rotatable or otherwise movable such that once the node is transferred near the coupling device, the coupling device may be be lowered (via a hinge or other mechanism) onto the node, as shown in FIGS. 10A-B. FIG. 10A shows coupling device 1020 in an upright or stored position, and FIG. 10B shows coupling device 1020 in a direct contact mating arrangement to positive power connector/terminal 1015 located within groove 1013 on node 1011. For simplicity, the equivalent negative power connector and coupling device is not shown. Positive power connector/coupling device 1020 may comprise a substantially fixed portion 1022 and a moveable portion 1024 that is configured to engage node 1011. In some embodiments, coupling device 1020 may include portions (such as moveable section 1024) that can be deflected or otherwise flexible to further enhance contact between coupling device 1020 and node 1011 in case there are minor variations in node height or placement along the charging rack or station. In one embodiment, moveable portion 1024 rotates about fixed portion 1022 via one or more hinges (not shown). In other embodiments, individual portions of coupling device 1020 can be rotated sidewise (e.g., laterally/horizontally) so as to engage each of the nodes. In this alternative sidewise rotation embodiment, the power connectors on the node can be located on the bottom, side, or top faces of the node.

Figure 11A:
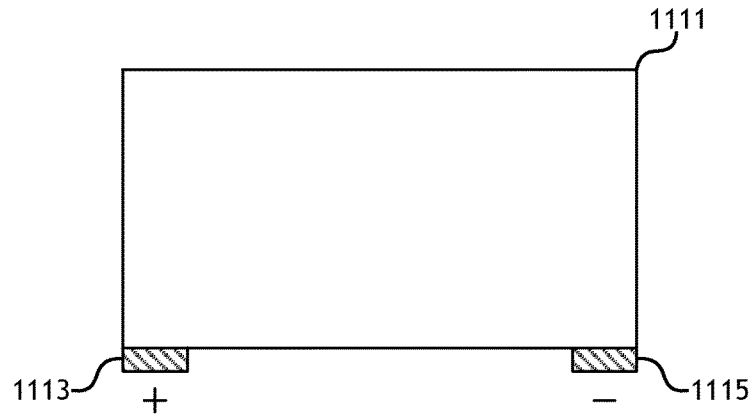
FIGS. 11A-11B illustrate various embodiments of an autonomous seismic node configured to be charged by a charging system.
Figure 11B:
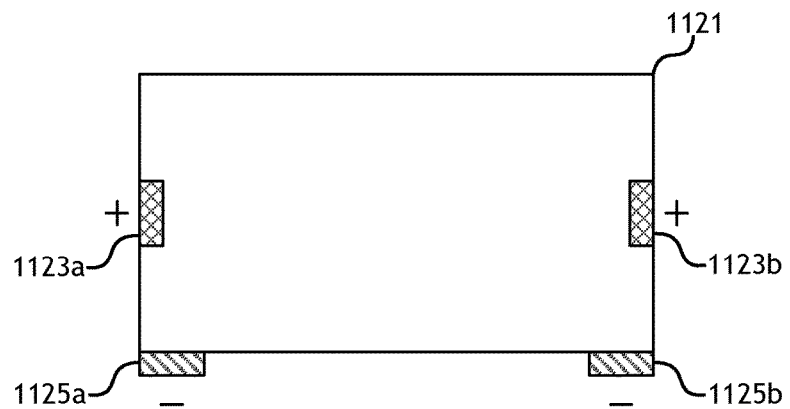

FIGS. 11A and 11B illustrate various side-view embodiments of a rechargeable node where protrusions 242 (see, e.g., FIG. 2B) may serve as conductors. FIG. 11A shows node 1111 with one or more protrusions 1113 that act as a positive node power connector and one or more protrusions 1115 that act as a negative node power connector. The protrusions 1113, 1115 may be configured to make contact to a power station to receive power. In one embodiment, the protrusions may rest upon a rail or rack in a charging container, similar to the embodiment shown in FIG. 6. Similarly, FIG. 11B shows node 1121 with a plurality of grooves 1123*a*, 1123*b* (each with one or more electrical contact points, not shown) and a plurality of protrusions 1125*a*, 1125*b* on the bottom face of node 1121. In one embodiment, plurality of grooves 1123*a*, 1123*b* comprises and/or is coupled with positive power node connectors, while plurality of protrusions 1125*a*, 1125*b* is configured as negative power node connectors. The grooves may be configured to interact with one or more first sections of a power station and the protrusions may be configured to sit on top of one or more second sections of a power station. The protrusions in FIGS. 11A and 11B may be coupled to a pressurized node housing portion of the node and/or a non-pressurized node housing portion of the node surrounding the pressurized node housing. In one embodiment protrusions 1125*a*, 1125*b* are coupled to the body of the node, which may serve as a ground.

Charging Container

Figure 12A:
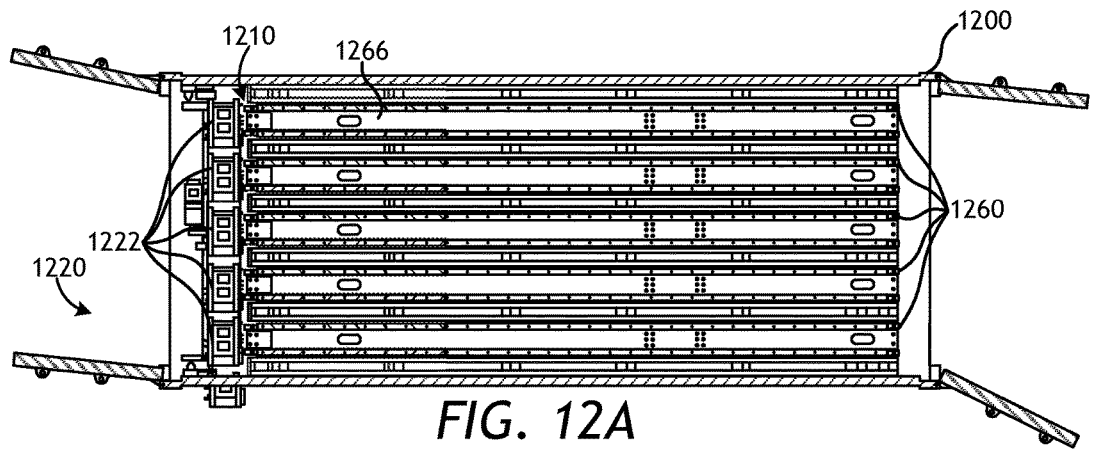
FIGS. 12A-12C illustrate one embodiment of a charging/storage container from a top, side, and front perspective, respectively.
Figure 12B:
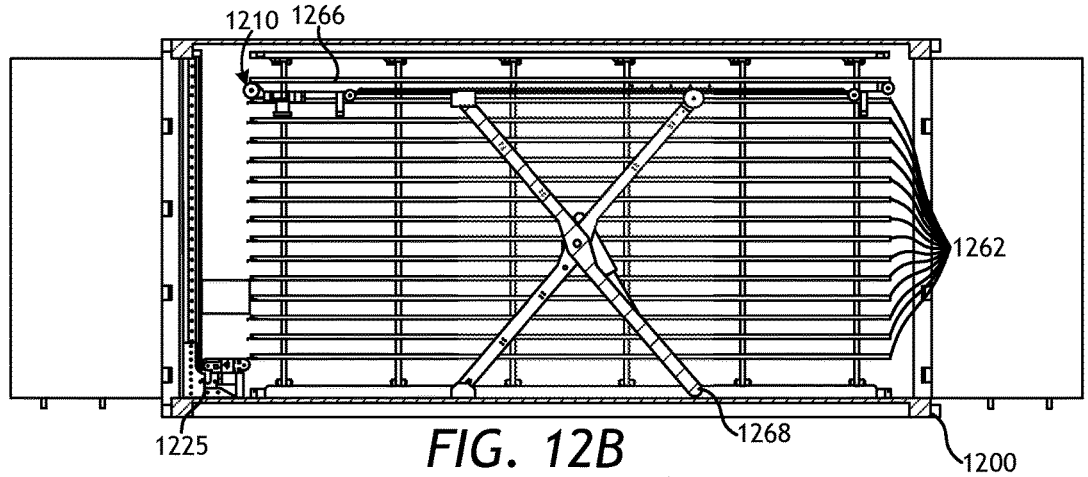
Figure 12C:
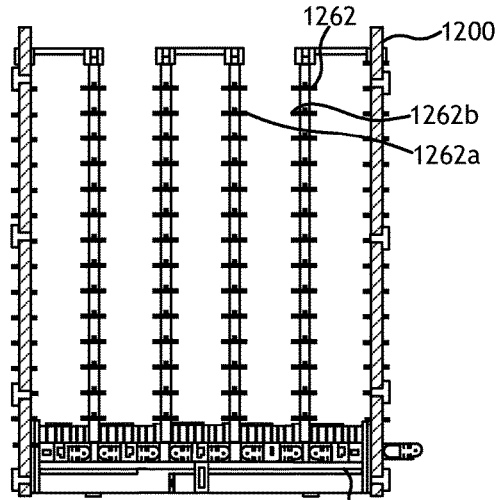

FIGS. 12A-12C show one embodiment of charging/storage container 1200 (which may be substantially similar to storage container 318). The charging/storage container may be a dedicated container for charging the plurality of autonomous seismic nodes, or it may be a storage container that is configured to store and charge a plurality of autonomous seismic nodes. In one embodiment, it is configured to hold a plurality of the storage racks shown in FIG. 6. FIGS. 12A-12C illustrate a top, side, and front schematic of container 1200, respectively. Further, FIG. 12C shows a plurality of nodes positioned on a conveyor system from an end/front view of the container. Charging/storage container 1200 is configured to hold a high capacity of nodes before and after being deployed in the sea. In one embodiment, each charging/storage container 1200 is a standard 20-foot CSC approved ISO container and holds between approximately 500 to 1000 nodes. Charging container 1200 may comprise one or more conveyor systems 1220 and plurality of storage racks 1260. The size and configuration of the racks depends on the configuration of the container and dimensions of the node. Each rack 1260 may comprise a series of rows (or levels) at different heights for storage of a plurality of nodes. In one embodiment, charging/storage container 1200 comprises five racks 1260, each of which has fifteen rows (or levels) 1262 with each configured to store thirteen nodes per row for a total storage of approximately 975 nodes per container. If only twelve rows are used, each container may hold approximately 780 nodes. Various configurations and more or less racks and rows can be utilized to achieve a higher or lower node capacity. For example, container 1200 may be configured with a number of racks configured with rows that hold twelve nodes or less with the remaining racks having rows configured to hold thirteen nodes. In one embodiment, the racks are more than half of the length of container 1200, and in other embodiments, the racks are substantially the length of container 1200. In one embodiment, there is no room for movement in the storage container by operators when it is fully loaded with nodes; in other embodiments, container 1200 may comprise enough room for operators to walk between the rows of nodes. As shown in FIG. 12C the racks may have rail mechanisms or guides 1262 from which a corresponding groove on the node can fit, and the rail and node grooves may have corresponding electrical contacts for charging or powering the node such that all nodes in a given row can be simultaneously charged. For a storage container full of nodes (e.g., 1000 nodes in a single container), sufficient cooling is needed to keep temperatures at a safe level to prevent node and battery damage, which may require increased air conditioning capacity for that container.

In one embodiment, conveyor system 1220 is configured to receive and send nodes to adjacent containers and to transport nodes to and from the node racks for charging and/or storage. In one embodiment conveyor system 1220 is substantially positioned on one end of the container and is coupled to one or more second conveyor systems 1210 that are substantially positioned parallel to the sides of the container, such that conveyor system 1210 is substantially perpendicular to conveyor system 1220. Conveyor system 1220 may include a plurality of rotatable node conveyors 1222. Other conveyor devices, components, and systems are possible and may be coupled together in a variety of configurations to move nodes from one container or section to another container or section. For example, if five node charging/storage racks 1260 are utilized, then five rotatable node conveyors 1222 may be necessary. In one embodiment, first rotatable node conveyor 1222 is configured to receive and send nodes to and from an adjacent container, and may also be configured to rotate up to 360 degrees to receive and send nodes from adjacent portions of conveyor system 1220 and to one of node storage racks 1260.

In one embodiment, each rack 1260 may have has its own conveyor system 1266. Conveyor system 1220 is configured to move a node from a position on conveyor system 1220 by rotating node conveyor 1222 by 90 degrees and advancing the node to a position on conveyor 1266 on each rack row. Rather than each row having its own conveyor system, the charging/storage racks may comprise a plurality of levels, each with one or more storage mechanisms to hold and/or store a plurality of nodes. For example, each level or row of rack 1260 may comprise a plurality of charging bars, rods, or rails 1262 upon which one or more nodes can be positioned. Thus, charging rails 1262 may function as both charging elements and storage elements. In one embodiment, charging rails 1262 are substantially similar to the charging rails illustrated in FIG. 6. Charging rails 1262 may be coupled to a power station (such as power station 430 in FIG. 4) and be configured to power the plurality of nodes while they are positioned in charging/storage racks 1260. In other embodiments, rails 1262 may be for storage purposes only and a second set of rails (not shown) may function as charging rails. This second set of rails may be fixed (such that it slides within a groove on the nodes) or may be moveable such that it extends to the node power connectors after the nodes have been positioned on rails 1262. In some embodiments, for a given level or row of rack 1260, the rack may have a plurality of rails 1262*a*, 1262*b* (see FIG. 12C) such that charging rail 1262*a* acts as a positive coupling device/connector and charging rail 1262*b* acts as a negative coupling device/connector.

In one embodiment, conveyor system 1210 comprises a lateral conveyor 1266 that may be attached or coupled to a lifting or hoisting mechanism 1268 (such as a scissors lift) that is configured to raise conveyor 1266 to a certain height, such as the height of each row. In one embodiment, lateral conveyor 1266 is substantially the length of charging/storage racks 1260. During transfer of the nodes to and from charging racks 1260, lateral conveyor 1266 may be positioned slightly above rails 1262 so that the nodes do not touch the rails, racks, and/or shelves. Once the desired number of nodes have been transferred from conveyor system 1220 to conveyor 1266, lifting mechanism 1268 lowers lateral conveyor 1266 a predetermined distance, which allows engagement and/or contact of a plurality of nodes to charging rails 1262. In other words, lowering of lifting mechanism 1268 (and coupled lateral conveyor 1266) allows the plurality of nodes to drop or be set on top of charging rails 1262. The lateral conveyor 1266 can be lowered to a lower level/row of the rack for storing another plurality of nodes for charging. In one embodiment, the rows on the uppermost level of the racks are filled first, and each lower level is subsequently filled to capacity with the desired number of nodes. In deployment mode, nodes from the lowermost level of the racks are deployed first. Thus, the system may be a first in last out (FILO) charging/storage system. As each level is deployed, elevator mechanism 1268 raises conveyor 1266 to touch and/or engage the bottom portions of the nodes and then lifts or raises the nodes from contact with charging rails 1262. In one embodiment, the width of conveyor 1266 and lifting mechanism 1268 is less than the horizontal distance between first rail 1262*a* and second rail 1262*b* so as to freely move the entire vertical distance within rack 1260. Other transport systems and devices can be utilized to transport the nodes to the racks (and each level of the racks) and to various positions along the rack. More details of the storage system and conveyor system are described in U.S. patent application Ser. No. 14/711,262, filed on May 13, 2015, incorporated herein by reference. For example, because the plurality of racks have multiples rows/levels at various heights, conveyor system 1220 is configured to move a plurality of nodes to the plurality of racks 1260 at different heights. In one embodiment, conveyor system 1220 is coupled to an elevator mechanism 1225 that is configured to lift conveyor system 1220 (and any nodes that are located on conveyor system 1220) to the appropriate height. Once the desired number of nodes are positioned on conveyor system 1220, elevator mechanism 1225 moves to the appropriate height of the desired rack row.

In operation, a plurality of autonomous seismic nodes may be simultaneously charged by a variety of methods. The nodes may be charged after deployment and/or before deployment. The nodes may be charged in a charging/storage container and/or be charged in a separate container or transport device and later moved to a storage container for more permanent storage. In one embodiment, a plurality of autonomous nodes is retrieved from the seabed, whether by ROV, retrieval of a deployment line coupled to the nodes, or some other method. The method may comprise positioning a plurality of nodes proximate to a charging station, such as a power station with a plurality of charging connectors. The charging connectors may be a plurality of charging rails located on a storage rack in a CSC approved ISO container. Thus, the positioning step may include positioning the plurality of nodes on or proximate to a plurality of charging rails. The nodes may be moved to the charging rails all at once or sequentially at different times. In some embodiments, the method may further include coupling each of the plurality of charging connectors to a plurality of node power connectors on each of the plurality of nodes. This step may include moving the charging connectors into contact with the node power connectors and/or engaging or actuating the node power connectors so as to directly contact the node power connectors to the charging connectors of the charging station. The charging method may further include simultaneously charging the plurality of autonomous seismic nodes. This can be performed manually (such as by the flip of a power switch) or automatically once a predetermined number of nodes are coupled to the charging station. The plurality of nodes may be charged at a single voltage for a predetermined amount of time or one or more control systems within the power station is configured to regulate the supplied power to the plurality of nodes. In still other embodiments, the power station is configured to communicate with a battery management system on the plurality of nodes for power regulation. Once the appropriate charge has been supplied to the plurality of nodes, the charging station can be manually turned off or automatically programmed to turn off after a predetermined time or upon notification that each of the plurality of nodes have been fully charged. These steps can be repeated for additional sets of pluralities of nodes. For example, once a first level of a storage rack has been filled with a first plurality of nodes, that level may begin charging. After a second level has been filled with a second plurality of nodes, that level may be begin charging, whether at the same time or a subsequent time as the first level charging. Different levels or rows of nodes can be charged at different rates for power consumption issues and/or cooling issues (such as high voltage for quick power charging for a first set of nodes and low voltage for slow charging for a second set of nodes).

Many other variations in the configurations of a node, the charging racks, and/or the power station are possible within the scope of the invention. For example, the node may be circular or rectangular shaped, and the contact points on the node for charging may be located on the bottom, side, or top surfaces (or groove thereof) of the node. Similarly, the body of the node (or portions thereof) may act as a ground such that only a positive node power connector needs to have a separate terminal, groove, or connector on the node. Likewise, the nodes may be charged before deployment and/or after deployment. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. An autonomous seismic node, comprising:
    at least one seismic sensor, at least one data recording unit, and at least one clock;
    a plurality of rechargeable battery cells; and
    a plurality of charging connectors coupled to the plurality of rechargeable battery cells,
    wherein the plurality of charging connectors comprises a first connector configured to couple with a first rail of a charging system and a second connector configured to couple with a second rail of a charging system.

2. The seismic node of claim 1, wherein the plurality of charging connectors comprises a positive connector and a negative connector.

3. The seismic node of claim 1, wherein the plurality of charging connectors comprises a positive connector on a first side of the node and a negative connector on a second side of the node.

4. The seismic node of claim 1, wherein the plurality of charging connectors are located in one or more grooves on the node.

5. The seismic node of claim 1, wherein the plurality of charging connectors are located on a bottom face of the node.

6. The seismic node of claim 1, wherein the plurality of charging connectors comprises a plurality of metallic protrusions on a lower surface of the node.

7. The seismic node of claim 1, wherein one of the plurality of charging connectors is a ground located on a portion of the node body.

8. The seismic node of claim 1, further comprising a battery management system coupled to the plurality of rechargeable battery cells, wherein the battery management system is configured to regulate the charging of the plurality of rechargeable battery cells based on power received from a power station.

9. The seismic node of claim 8, wherein the battery management system comprises a plurality of battery sensors and a direct current charger.

10. A method of automatically charging a plurality of autonomous seismic nodes, comprising:
    positioning a plurality of autonomous seismic nodes proximate to a plurality of charging connectors located on a storage rack, wherein the charging connectors comprises rails, wherein each of the plurality of autonomous seismic nodes has a plurality of rechargeable battery cells and a plurality of node power connectors coupled to the plurality of rechargeable battery cells;

contacting the plurality of node power connectors for each of the plurality of autonomous seismic nodes with the plurality of rails; and simultaneously charging the plurality of autonomous seismic nodes by transmitting power through at least one of the plurality of rails.

11. The method of claim 10, further comprising regulating the charging of the plurality of autonomous seismic nodes.

12. The method of claim 9, wherein each of the plurality of autonomous seismic nodes has a plurality of grooves, wherein the positioning step comprises moving the plurality of seismic nodes such that the plurality of grooves are coupled with the plurality of rails.

13. The method of claim 9, further comprising communicating with each of the plurality of autonomous seismic nodes to regulate the charging of the nodes.

14. An automatic system for simultaneously charging a plurality of autonomous seismic nodes, comprising:

a plurality of autonomous seismic nodes, wherein each of the plurality of autonomous seismic nodes has a plurality of rechargeable battery cells; and at least one power station configured to charge the plurality of autonomous seismic nodes, wherein the power station comprises a power source and a plurality of charging connectors, wherein the power station is coupled to each of the plurality of autonomous seismic nodes by the plurality of charging connectors, wherein each of the plurality of charging connectors is coupled to the plurality of autonomous seismic nodes.

15. The system of claim 14, further comprising a control system configured to regulate the charging of the plurality of autonomous seismic nodes.

16. The system of claim 14, wherein the plurality of charging connectors comprises a positive charging connector and a negative charging connector.

17. The system of claim 14, wherein the plurality of charging connectors comprises a first rail and a second rail, wherein the first rail is configured to be a positive charging connector and the second rail is configured to be a negative charging connector.

18. The system of claim 17, wherein each of the plurality of autonomous seismic nodes comprises a positive charging receptacle configured to couple with the first rail and a negative charging receptacle configured to couple with the second rail.

19. The system of claim 14, wherein the plurality of charging connectors comprises a plurality of rails coupled to one or more storage racks in a storage container.

* * * * *